United States Patent
Takasaka et al.

(10) Patent No.: US 8,494,378 B2
(45) Date of Patent: Jul. 23, 2013

(54) SYNCHRONOUS OPTICAL SIGNAL GENERATING DEVICE AND SYNCHRONOUS OPTICAL SIGNAL GENERATING METHOD

(75) Inventors: Shigehiro Takasaka, Chiyoda (JP); Yasuyuki Ozeki, Ichihara (JP); Misao Sakano, Chiyoda (JP)

(73) Assignees: Japan Science and Technology Agency, Kawaguchi-shi (JP); The Furukawa Electric Co., Ltd., Tokyo (JP)

( * ) Notice: Subject to any disclaimer, the term of this patent is extended or adjusted under 35 U.S.C. 154(b) by 685 days.

(21) Appl. No.: 12/293,314

(22) PCT Filed: Jul. 6, 2007

(86) PCT No.: PCT/JP2007/063539
§ 371 (c)(1),
(2), (4) Date: Sep. 17, 2008

(87) PCT Pub. No.: WO2008/007615
PCT Pub. Date: Jan. 17, 2008

(65) Prior Publication Data
US 2009/0208200 A1  Aug. 20, 2009

(30) Foreign Application Priority Data
Jul. 11, 2006  (JP) .................................. 2006-190770

(51) Int. Cl.
*H04B 10/04* (2011.01)
*H04B 10/145* (2006.01)

(52) U.S. Cl.
USPC ........... 398/201; 398/154; 398/155; 398/184; 398/193

(58) Field of Classification Search
USPC .......................... 398/154, 155, 184, 193, 201
See application file for complete search history.

(56) References Cited

U.S. PATENT DOCUMENTS 5,566,381 A * 10/1996 Korotky ......................... 398/147
6,980,353 B2 * 12/2005 Watson et al. ................. 359/326

(Continued)

FOREIGN PATENT DOCUMENTS

| EP | 1 006 688 A2 | 6/2000 |
| EP | 1 006 688 A3 | 6/2000 |

(Continued)

OTHER PUBLICATIONS

Silva, "110 GHz Opto-electronic Frequency Synthesizer Using Optical Comb Generator and Uni-Travelling-Carrier Photodiode," Microwave Photonics, 2001, pp. 29-32.*

(Continued)

*Primary Examiner* — Jessica Stultz
*Assistant Examiner* — Michael Carter
(74) *Attorney, Agent, or Firm* — Oblon, Spivak, McClelland, Maier & Neustadt, L.L.P.

(57) ABSTRACT

A synchronous optical signal generation device includes: an optical phase detector that compares the phase of a reference optical signal with a phase of an optical beat signal to generate a phase error signal; a shaping mechanism that shapes the phase error signal; and a voltage controlled optical signal generator that generates an optical beat signal based on the shaped phase error signal and that outputs the optical beat signal while feeding the optical beat signal back to the phase detector.

19 Claims, 12 Drawing Sheets

U.S. PATENT DOCUMENTS

| | | | |
|---|---|---|---|
| 7,315,665 B1 * | 1/2008 | Anderson | 385/11 |
| 7,373,086 B2 * | 5/2008 | Yamamoto et al. | 398/146 |
| 2002/0015212 A1 | 2/2002 | Fujiwara et al. | |
| 2003/0223757 A1 | 12/2003 | Yamamoto et al. | |
| 2004/0263949 A1 * | 12/2004 | Gu et al. | 359/333 |
| 2005/0111848 A1 * | 5/2005 | Grubb et al. | 398/147 |

FOREIGN PATENT DOCUMENTS

| | | |
|---|---|---|
| EP | 1 369 742 A1 | 12/2003 |
| JP | 2000 174699 | 6/2000 |
| JP | 2002 156616 | 5/2002 |
| JP | 2002 318374 | 10/2002 |
| JP | 2004 62153 | 2/2004 |
| WO | 03 104886 | 12/2003 |
| WO | 2006 041103 | 4/2006 |

OTHER PUBLICATIONS

Shigehiro Takasaka, et al., "Optical Phase-Locking of 160 GHz Optical Beat to 40 GHz Optical Pulse Train Using a Three-Electrode DFB-LD and a Si Avalanche Photodiode", ECOC 2005 Proceedings, 31st European Conference on Optical Communication, vol. 4, XP002541858, 2005, pp. 799-800.

T. Yamamoto, et al., "270-360 GHz Tunable Beat Signal Light Generator for Photonic Local Oscillator", Electronic Letters, vol. 38, No. 15, XP006018575, Jul. 18, 2002, 2 pages.

M.A. Grant, et al., "The Performance of Optical Phase-Locked Loops in the Presence of Nonnegligible Loop Propagation Delay", Journal of Lightwave Technology, vol. LT-5, No. 4, XP002541859, Apr. 1987, pp. 592-597.

H. Suzuki, et al., "Photonic Millimetre-Wave Generator Using Intensity and Phase Modulators for 10 Gbit/s Wireless Link", Electronics Letters, vol. 41, No. 6, XP006023674, Mar. 17, 2005, 2 pages.

Fukushima, S. et al., "Optoelectronic Synthesis of Milliwatt-Level Multi-Octave Millimeter-Wave Signals Using an Optical Frequency Comb Generator and a Unitraveling-Carrier Photodiode", IEEE Photonics Technology Letters, vol. 13, No. 7, pp. 720-722, (2001).

Office Action issued Dec. 18, 2012, in Japanese Patent Application No. 2008-524773 with English translation.

* cited by examiner

SYNCHRONOUS OPTICAL SIGNAL GENERATING DEVICE AND SYNCHRONOUS OPTICAL SIGNAL GENERATING METHOD

TECHNICAL FIELD

The present invention relates to a synchronous optical signal generating device which outputs an optical signal synchronized with an input optical signal, and a synchronous optical signal generating method.

BACKGROUND ART

Conventionally, an optical phase-locked loop device has been proposed as a device for generating an optical beat signal synchronized with a reference optical signal (e.g. see Patent Document 1). An example of the optical phase-locked loop device will be described with reference to FIG. 21. FIG. 21 shows a configuration of an optical phase-locked loop device 400.

As shown in FIG. 21, the optical phase-locked loop device 400 includes three elements: an optical phase detector having a multiplexer 410 and an optical phase comparator 420; a loop filter 430; and an OVCO (optical voltage controlled oscillator) 440. In the optical phase-locked loop device 400, an optical signal is an input signal, and an optical beat signal synchronized with the input signal is outputted from the OVCO 440. The optical components are connected with each other through an optical fiber or the like as an optical path. The same is true of the following description.

The OPLL 440 includes LDs (laser diodes) 441 and 442, and an optical coupler 443. In the OVCO 440, output beams of light of the two LDs 441 and 442 with different output light wavelengths are multiplexed in the optical coupler 443. Here, the optical outputs of the LDs 441 and 442 have the same polarization. As a result, the two optical outputs interfere with each other inside the optical coupler 443, and the optical coupler 443 outputs an optical beat signal that oscillates at a frequency corresponding to a wavelength difference. A restriction on the wavelength difference depends upon a band of the optical coupler 443. The LDs 441 and 442 is capable of changing the output wavelengths depending upon a driving current or a control temperature. Accordingly, the OVCO 440 is capable of controlling the output wavelengths of the LDs 441 and 442 in accordance with the input optical signal to change the frequency of the optical beat signal to be outputted.

The optical phase comparator 420 outputs an electrical signal (phase error signal) corresponding to a phase difference between optical intensities of two input signals by using a nonlinear effect such as two-photon absorption, second harmonic generation, four-wave mixing or Kerr effect. The loop filter 430 averages and shapes the phase error signal, and outputs a control signal for the OVCO 440.

Patent Document 1: International Publication No. WO 03/104886 Pamphlet

DISCLOSURE OF INVENTION

Problem to be Solved by the Invention

The conventional optical phase-locked loop device 400 has been characterized in that, since the beat light source has two LDs 441 and 442 and its line width is large, a loop band is required to be a wide band of not smaller than 10 MHz in order to realize a small timing jitter. FIG. 22 shows a relation of phase noise to a carrier frequency in the OVCO.

As indicated by a dotted line in FIG. 22, an output optical signal of the OVCO at free running has a spectrum characteristic that the phase noise spreads right and left with a prescribed frequency at the center. On the other hand, as indicated by a solid line in FIG. 22, if this OVCO is phase-lock-looped and outputs a synchronous beat signal, the phase noise is suppressed in a prescribed range with the prescribed frequency at the center. The frequency band in this suppressed portion almost coincides with the loop band. A wider loop band can result in generation of a signal with higher frequency purity (smaller phase noise). The timing jitter corresponds to an integral quantity of the graph in FIG. 22. Therefore, the wider the loop band, the more the timing jitter of the output synchronous signal is reduced.

However, if the loop band is a wide band, power of an optical signal to be inputted into the optical phase detector should be more enhanced. In addition, a loop length has to be shortened if the loop band is a wide band.

Here, the loop length is represented as an optical fiber length multiplied by a refractive index of an optical fiber, and as a line length multiplied by an effective dielectric constant for a portion where an electrical signal propagates, and thereby as a sum of these lengths constituting the loop.

FIG. 23 shows dependence of a loop length on a loop band when a phase margin is 60 degrees and a phase delay is caused solely by the loop length. As shown in FIG. 23, when a phase delay is caused solely by the loop length, a maximum value of the allowable loop length is determined depending upon the loop band. Typically, a loop length with 60 degrees or more of phase margin is used.

Since the loop band of the optical phase-locked loop device 400 is a wide band of 10 MHz or more, the maximum value of the loop length has to be about 30 cm or less in order to realize a small phase noise of 7 degrees or less. Therefore, a loop configuration of the optical phase-locked loop device 400 has to be realized in a space optical system. It is difficult to manufacture (package) the optical phase-locked loop device 400 in the space optical system.

It is an object of the present invention to provide a synchronous optical signal generating device and a synchronous optical signal generating method capable of reducing a phase noise of a synchronous optical beat signal and setting a loop band and a loop length properly.

Means for Solving the Problem

In order to solve the problem, a synchronous optical signal generating device set forth in claim 1 is characterized by including: optical phase detecting means for comparing a phase of a reference optical signal with a phase of an optical beat signal to generate a phase error signal; shaping means for shaping the phase error signal; and voltage controlled optical signal generating means for generating an optical beat signal based on the shaped phase error signal and outputting the optical beat signal while feeding the optical beat signal back to the phase detecting means, wherein the voltage controlled optical signal generating means includes: voltage controlled electrical signal generating means for generating an electrical signal corresponding to the shaped phase error signal and outputting the electrical signal; optical comb generating means for generating an optical comb signal having optical spectrum lines with frequency intervals corresponding to the electrical signal generated by the voltage controlled electrical signal generating means; 2-mode selecting means for selecting optical signals having optical spectrum lines of two different wavelengths from the optical comb signal; and 2-mode multiplexing means for multiplexing the selected optical signals having two different wavelengths and outputting the multiplexed signal as the optical beat signal while feeding the optical beat signal back to the phase detecting means.

The invention set forth in claim 2 is characterized in that the optical phase detecting means includes: first multiplexing means for multiplexing the reference optical signal with the optical beat signal; and phase comparing means for outputting the phase error signal between the reference optical signal and the optical beat signal based on the multiplexed optical signal in the synchronous optical signal generating device of claim 1

The invention set forth in claim 3 is characterized in that the voltage controlled optical signal generating means includes frequency increasing means for increasing a frequency of the electrical signal generated by the voltage controlled electrical signal generating means, and the optical comb generating means generates the optical comb signal having optical spectrum lines with frequency intervals corresponding to the electrical signal whose frequency is increased by the frequency increasing means in the synchronous optical signal generating device of claim 1 or 2.

The invention set forth in claim 4 is characterized in that the optical comb generating means includes: a first laser light source for outputting laser light having a single wavelength; and light modulating means for modulating the outputted laser light to generate the optical comb signal based on the electrical signal generated by the voltage controlled electrical signal generating means in the synchronous optical signal generating device of any one of claims 1 to 3.

The invention set forth in claim 5 is characterized in that the optical comb generating means includes a plurality of light modulating means, and the plurality of light modulating means are connected in multiple stages, and the optical comb generating means further includes at least one phase shifting means for shifting a phase of the electrical signal and inputting the phase shifted electrical signal into the light modulating means in the synchronous optical signal generating device of claim 4.

The invention set forth in claim 6 is characterized in that the light modulating means is light phase modulating means for modulating a phase of the laser light to generate the optical comb signal or light intensity modulating means for modulating intensity of the laser light to generate the optical comb signal in the synchronous optical signal generating device of claim 4 or 5.

The invention set forth in claim 7 is characterized in that the optical comb generating means includes a nonlinear medium that widens an optical spectrum band of the optical comb signal in the synchronous optical signal generating device of any one of claims 1 to 6.

The invention set forth in claim 8 is characterized in that the 2-mode selecting means includes a passive element in the synchronous optical signal generating device of any one of claims 1 to 7.

The invention set forth in claim 9 is characterized in that the 2-mode selecting means includes: an arrayed optical waveguide grating for selecting optical signals having optical spectrum lines of two different wavelengths from the optical comb signal, and outputting the selected signals; and polarization adjusting means for matching a polarization of one of the optical signals outputted from the arrayed optical waveguide grating with a polarization of the other of the optical signals for adjustment, and the 2-mode multiplexing means multiplexes the one of the optical signals outputted from the polarization adjusting means with the other of the optical signals outputted from the arrayed optical waveguide grating in the synchronous optical signal generating device of any one of claims 1 to 8.

The invention set forth in claim 10 is characterized in that the 2-mode selecting means and the 2-mode multiplexing means include: a circulator into which the optical comb signal are inputted; an arrayed optical waveguide grating for selecting optical signals having optical spectrum lines of two different wavelengths from the optical comb signal inputted through the circulator, and outputting the selected signals; and Faraday rotator mirrors for reflecting the two optical signals outputted from the arrayed optical waveguide grating, the arrayed optical waveguide grating multiplexes the two optical signals reflected by the Faraday rotator mirrors, and outputs the multiplexed optical signal as the optical beat signal, and the circulator outputs the optical beat signal inputted from the arrayed optical waveguide grating in the synchronous optical signal generating device of any one of claims 1 to 8.

The invention set forth in claim 11 is characterized in that the 2-mode selecting means and the 2-mode multiplexing means include: polarization synthesizing means into which the optical comb signal is inputted with a polarization of the optical comb signal maintained; an arrayed optical waveguide grating for selecting optical signals having optical spectrum lines of two different wavelengths from the optical comb signal inputted through the polarization synthesizing means, and outputting the selected optical signals; and Faraday rotator mirrors for reflecting the two optical signals outputted from the arrayed optical waveguide grating, the arrayed optical waveguide grating multiplexes the two optical signals reflected by the Faraday rotator mirrors, and outputs the multiplexed optical signal as the optical beat signal, and the polarization synthesizing means outputs the optical beat signal inputted from the arrayed optical waveguide grating with a polarization of the optical beat signal maintained in the synchronous optical signal generating device of any one of claims 1 to 8.

The invention set forth in claim 12 is characterized in that the arrayed optical waveguide grating splits the optical comb signal at frequency intervals corresponding to frequency intervals of the optical comb signal in the synchronous optical signal generating device of any one of claims 9 to 11.

The invention set forth in claim 13 is characterized in that the 2-mode selecting means includes: dividing means for dividing the optical comb signal into two signals; and first and second filtering means for filtering the respective divided optical comb signals to obtain optical signals having optical spectrum lines of different wavelengths from one another, and the 2-mode multiplexing means multiplexes the optical signals having two different wavelengths from one another outputted from the first and second filtering means in the synchronous optical signal generating device of any one of claims 1 to 8.

The invention set forth in claim 14 is characterized in that the 2-mode selecting means includes: dividing means for dividing the optical comb signal into two signals; and second and third laser light sources for generating optical signals having different wavelengths from one another in accordance with the respective divided optical comb signals, and the 2-mode multiplexing means multiplexes the optical signals having two different wavelengths from one another respectively outputted from the second and third laser light sources in the synchronous optical signal generating device according to any one of claims 1 to 7.

The invention set forth in claim 15 is characterized in that the 2-mode selecting means includes: dividing means for dividing the optical comb signal into two signals; first phase-locked loop means for receiving one of the divided optical comb signals and a first output optical signal, generating an optical signal having a first wavelength in accordance with a phase difference of the received signals, and outputting the generated signal while feeding back the generated signal as the first output optical signal; and second phase-locked loop means for receiving the other of the divided optical comb signals and a second output optical signal, generating an optical signal having a second wavelength that is different from the first wavelength in accordance with a phase difference of the received signals, and outputting the generated signal while feeding back the generated signal as the second output optical signal, and the 2-mode multiplexing means multiplexes the optical signal having the first wavelength outputted from the first phase-locked loop means with the optical signal having the second wavelength outputted from the second phase-locked loop means in the synchronous optical signal generating device according to any one of claims 1 to 7.

A generating method of a synchronous optical signal set forth in claim 16 is characterized by including: a phase detecting step of comparing a phase of a reference optical signal with a phase of an optical beat signal to generate a phase error signal; a shaping step of shaping the phase error signal; and a voltage controlled optical signal generating step of generating an optical beat signal based on the shaped phase error signal and outputting the optical beat signal while feeding the optical beat signal back to the phase detecting step, wherein the voltage controlled optical signal generating step includes: a voltage controlled electrical signal generating step of generating an electrical signal corresponding to the shaped phase error signal and outputting the electrical signal; an optical comb generating step of generating an optical comb signal having optical spectrum lines with frequency intervals corresponding to the electrical signal generated by the voltage controlled electrical signal generating step; a 2-mode selecting step of selecting optical signals having optical spectrum lines of two different wavelengths from the optical comb signal; and a 2-mode multiplexing step of multiplexing the selected optical signals having two different wavelengths and outputting the multiplexed signal as the optical beat signal while feeding the optical beat signal back to the phase detecting step.

Effect of the Invention

According to the invention set forth in claims 1, 2 and 16, since two optical spectrum lines are selected from an optical comb signal generated based on an electrical signal having a narrow line width and then multiplexed to generate an optical beat signal having a narrow line width synchronized with a reference optical signal, a loop band can be narrow, and a phase noise and a timing jitter can be reduced. Since the loop band is narrow, it is possible to allow an appropriate loop length to such a degree that a synchronous optical signal generating device can be manufactured using a fiber optical system, and to reduce power consumption.

According to the invention set forth in claim 3, it is possible to widen a band of 2-mode selecting means (an optical filter, an arrayed optical waveguide grating, or the like) which is used for extracting optical signals having two different wavelengths from the optical comb signal, thereby reducing the cost.

According to the invention set forth in claim 4, it is possible to generate the optical comb signal by modulating laser light.

According to the invention set forth in claim 5, it is possible to widen an optical spectrum band of the optical comb signal.

According to the invention set forth in claim 6, it is possible to readily configure an optical modulator by using an optical phase modulator or an optical intensity modulator.

According to the invention set forth in claim 7, it is possible to widen the spectrum band of the optical comb signal, and also reduce a length of a nonlinear medium.

According to the invention set forth in claim 8, since the 2-mode selecting means includes a passive element, it is possible to reduce power consumption.

According to the invention set forth in claim 9, it is possible to readily select optical signals having two different wavelengths from the optical comb signal by an arrayed optical waveguide grating, and easily match polarizations of the optical signals having two different wavelengths by polarization adjusting means. Therefore, the optical signals having two different wavelengths can easily interfere with each other.

According to the invention set forth in claim 10, it is possible to readily select optical signals having two different wavelengths from the optical comb signal and to easily match polarizations of the optical signals having two different wavelengths by an arrayed optical waveguide grating and Faraday rotator mirrors. Therefore, the optical signals having two different wavelengths can easily interfere with each other without polarization adjusting means.

According to the invention set forth in claim 11, it is possible to readily select optical signals having two different wavelengths from the optical comb signal and to easily match polarizations of the optical signals having two different wavelengths by an arrayed optical waveguide grating and Faraday rotator mirrors. Therefore, the optical signals having two different wavelengths can easily interfere with each other without polarization adjusting means. It is also possible to readily input and output the signal with the polarization maintained in the 2-mode selection and multiplexing.

According to the invention set forth in claim 12, it is possible to select the optical signals having two different wavelengths from the optical comb signal more easily.

According to the invention set forth in claim 13, it is possible to readily select the optical signals having two different wavelengths by filtering optical comb signals, and readily multiplex the optical signals having two different wavelengths.

According to the invention set forth in claim 14, it is possible to generate optical signals having different wavelengths from one another by second and third laser light sources using the optical comb signal as excitation light, and readily multiplex the optical signals having two different wavelengths. In addition, requirement for frequency intervals of the optical comb signal is loosened, and it is possible to make the frequency intervals small.

According to the invention set forth in claim 15, it is possible to generate optical signals having first and second wavelengths different from each other in accordance with the optical comb signal by first and second phase-locked loop means, and readily multiplex the optical signals having two different wavelengths. In addition, requirement for frequency intervals of the optical comb signal is loosened, and it is possible to make the frequency intervals small.

BEST MODE FOR CARRYING OUT THE INVENTION

Embodiments of the present invention and modified examples of the embodiments will be sequentially described below with reference to the drawings.

Figure 1:
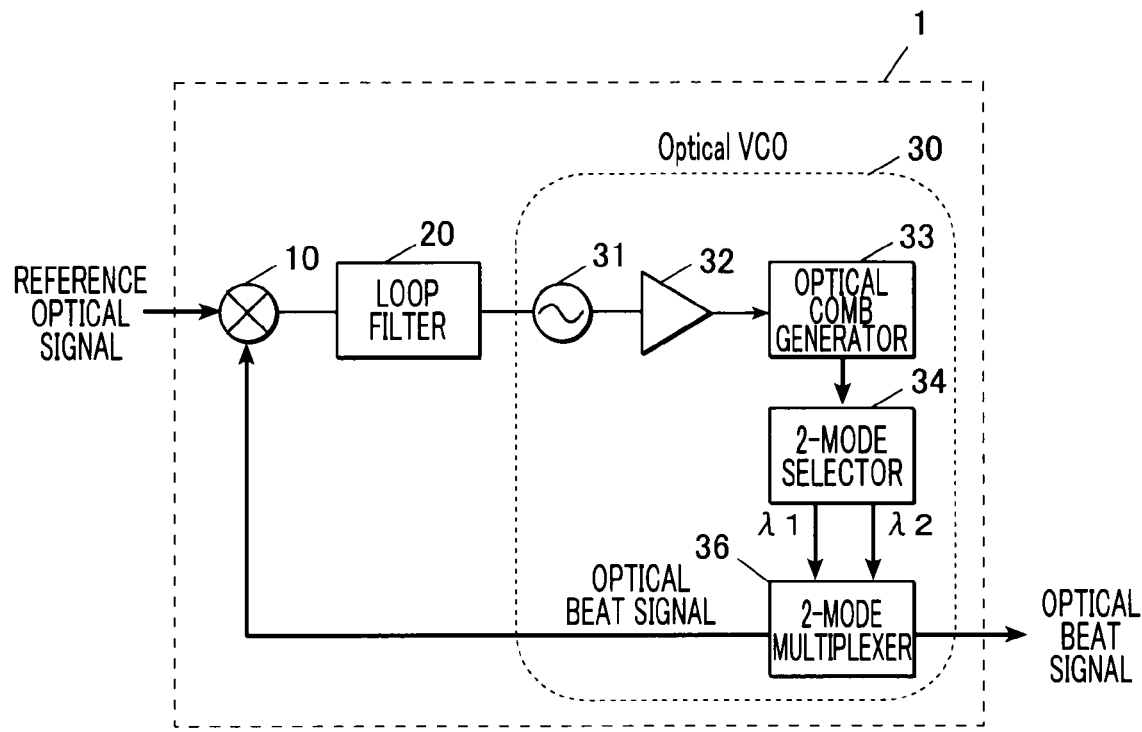
FIG. 1 shows a configuration of a synchronous optical signal generating device according to embodiments of the present invention.

First, a synchronous optical signal generating device 1 of the present embodiments will be described with reference to FIGS. 1 and 2. FIG. 1 shows a configuration of the synchronous optical signal generating device 1 of the present embodiments.

As shown in FIG. 1, the synchronous optical signal generating device 1 includes the following three fundamental elements: an optical phase detector 10 as optical phase detecting means; a loop filter 20 as shaping means; and an OVCO (optical voltage controlled (beat frequency variable) oscillator) 30 as voltage controlled optical signal generating means.

The optical phase detector 10 compares two incoming optical signals (a reference optical signal and an optical beat signal), and outputs a phase error signal as a result of the comparison. In FIG. 1, the reference optical signal and the optical beat signal are separately inputted into the optical phase detector 10, but for example, the two optical signals may be multiplexed by a multiplexer (not shown), and then inputted into the optical phase detector 10.

The optical phase detector 10 is a phase detector using two-photon absorption. If wavelengths of the reference optical signal and the optical beat signal are in a range of 1100 [nm] and 2200 [nm], examples of the phase detector using the two-photon absorption include a Si-PD (photo diode) or a Si-APD (avalanche photo diode). In this case, an electric current based on two-photon absorption as a nonlinear optical effect that occurs in the Si-PD or Si-APD is outputted as a phase error signal. If the Si-APD or the like is employed, it is possible to reduce dependency on polarization as compared to phase detectors that employ other systems, and to simplify the configuration, which is preferable.

In order to induce the two-photon absorption effectively, the input optical signal may be focused with a lens so that a spot size becomes the smallest on a light receiving surface of the Si-APD or the like. It is preferable that this lens should have as large an NA (numerical aperture) as possible. Moreover, in order to reduce reflection of the input optical signal, AR coating (anti reflection coating) may be applied to the surface of the Si-APD or the like. It is further preferable that the Si-APD or the like should have a high sensitivity at a wavelength different from a wavelength of the input optical signal, and that the AR coating should correspond to the wavelength of the input optical signal.

The reference optical signal generated by an external device (not shown), and the optical beat signal outputted from the OVCO 30 are inputted into the optical phase detector 10, and the phase error signal is generated and outputted. The loop filter 20 averages (shapes) the phase error signal from the optical phase detector 10, and outputs the phase error signal. The OVCO 30 generates an optical beat signal based on the phase error signal outputted from the loop filter 20, and outputs the optical beat signal.

The OVCO 30 outputs an optical beat signal having a frequency corresponding to the phase error signal inputted from the loop filter 20. The OVCO 30 includes a VCO (voltage controlled oscillator) 31 as voltage controlled electrical signal generating means, an RF amplifier 32, an optical comb generator 33 as optical comb generating means, a 2-mode selector 34 as 2-mode selecting means, and a 2-mode multiplexer 36 as 2-mode multiplexing means.

The VCO 31 outputs an electrical signal having a variable frequency based on the averaged phase error signal inputted from the loop filter 20. The RF amplifier 32 amplifies the averaged phase error signal inputted from the loop filter 20, and outputs the amplified signal.

The optical comb generator 33 generates a plurality of optical spectrum lines (optical comb signal) whose frequency intervals are equal to the frequency of the electrical signal outputted by the RF amplifier 32 (VCO 31), and outputs the generated optical comb signal. The 2-mode selector 34 extracts two line spectrums (wavelengths λ1 and λ2) from the optical comb signal inputted from the optical comb generator 33, and outputs an optical signal having a wavelength λ1 and an optical signal having a wavelength λ2. The 2-mode multiplexer 36 matches the polarizations of the optical signal having the wavelength λ1 and the optical signal having the wavelength λ2 which are extracted and inputted by the 2-mode selector 34, and multiplexes the optical signals to generate an optical beat signal. The 2-mode multiplexer 36 then outputs the optical beat signal to the outside and the optical phase detector 10.

Figure 2:
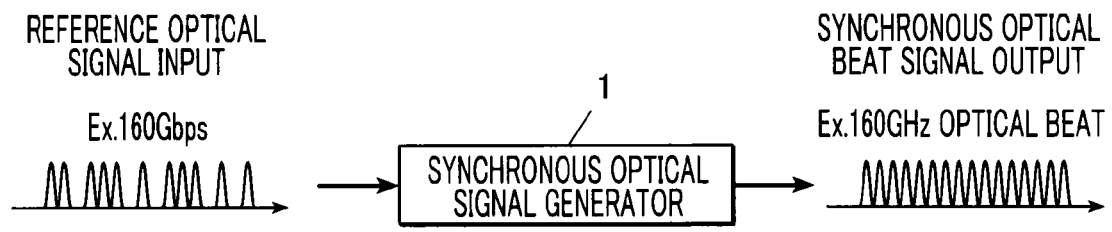
FIG. 2 shows input and output configurations of the synchronous optical signal generating device.

FIG. 2 shows input and output configurations of the synchronous optical signal generating device 1. As shown in FIG. 2, upon input of a reference optical signal, the synchronous optical signal generating device 1 outputs a synchronous optical beat signal synchronized with the reference optical signal. For example, the synchronous optical signal generating device 1 outputs an optical beat signal of 160 GHz in accordance with an input of a reference optical signal of 160 Gbps.

Figure 3:
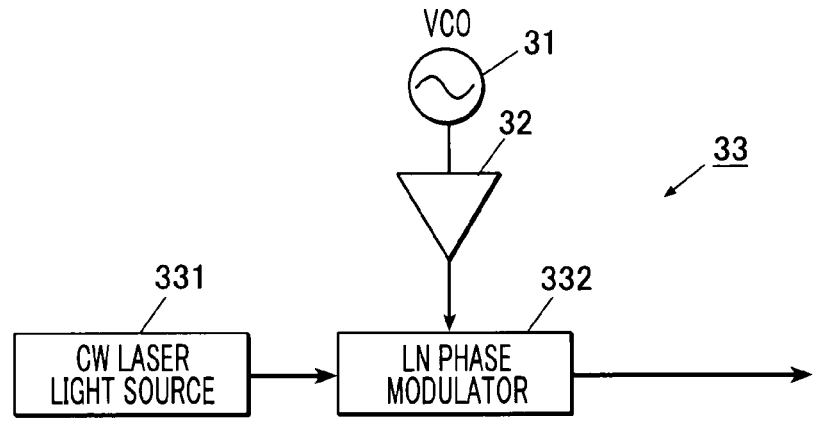
FIG. 3 shows an internal configuration of an optical comb generator.

FIG. 3 shows an internal configuration of the optical comb generator 33. As shown in FIG. 3, the optical comb generator 33 includes a CW (continuous wave (oscillation)) laser light source 331 as a first laser light source and an LN (lithium niobate) phase modulator 332 as optical phase modulating means. The CW laser light source 331 outputs a continuous wave laser light. The electrical signal from the VCO 31 is amplified by the RF amplifier 32 and then inputted into the LN phase modulator 332, and a refractive index of a waveguide changes due to this electric signal. The LN phase modulator 332 generates a plurality of optical spectrum lines (optical comb signal) whose frequency intervals are equal to the frequency of the electrical signal, and outputs the optical comb signal. The output of the LN phase modulator 332 is directly linked to an input of the 2-mode selector 34.

Figure 4:
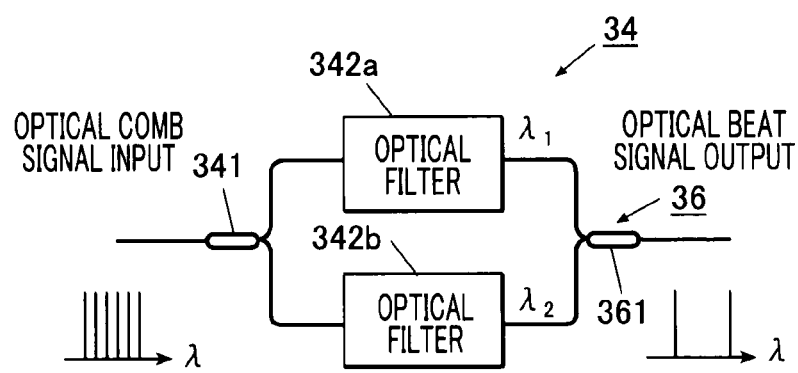
FIG. 4 shows internal configurations of a 2-mode selector and a 2-mode multiplexer.

FIG. 4 shows internal configurations of the 2-mode selector 34 and the 2-mode multiplexer 36. As shown in FIG. 4, the 2-mode selector 34 includes a divider 341 as dividing means and optical filters 342a and 342b as first and second filtering means. The divider 341 includes an optical coupler, divides the optical comb signal outputted from the optical comb generator 33, and outputs the divided signals. The respective optical comb signals obtained by the divider 341 are inputted into the optical filters 342a and 342b. Each of the optical filters 342a and 342b filters the optical comb signal, and outputs a spectrum line (an optical signal) having a predetermined wavelength. The optical filter 342a outputs an optical signal having a wavelength λ1. The optical filter 342b outputs an optical signal having a wavelength λ2. The optical filters 342a and 342b are adjusted so as to match polarizations of the optical signal having the wavelength λ1 and the optical signal having the wavelength λ2.

As shown in FIG. 4, the 2-mode multiplexer 36 includes a multiplexer 361. The multiplexer 361 includes an optical coupler or the like. In the multiplexer 361, the optical signal having the wavelength λ1 and the optical signal having the wavelength λ2, which are inputted from the optical filters 342a and 342b respectively and the polarizations of which match, interfere with each other for multiplexing. The multiplexer 361 generates a (synchronous) optical beat signal having a frequency corresponding to a frequency difference between the wavelengths λ1 and λ2, and outputs the generated signal to the optical phase detector 10 for feedback. The multiplexer 361 also outputs the generated signal to the outside as an output signal.

The synchronous operation of the synchronous optical signal generating device 1 is based on a PLL technique. Specifically, a phase error signal between an optical beat signal and a reference optical signal, which is detected by the optical phase detector 10, is shaped by the loop filter 20, and then negatively fed back to the OVCO 30, so that the reference optical signal and the optical beat signal is synchronized.

Figure 22:
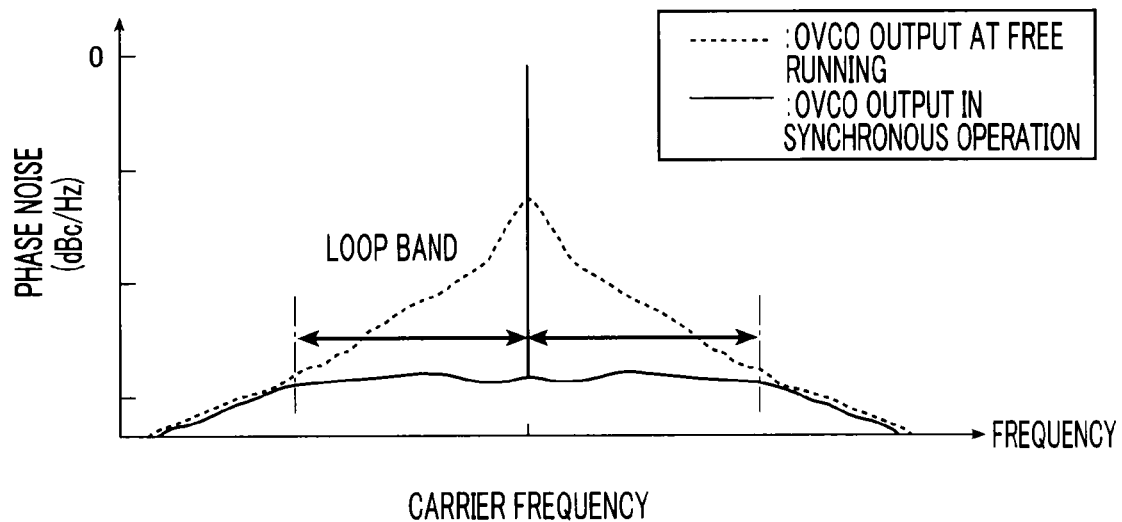
FIG. 22 shows a relation of phase noise to a carrier frequency in an OVCO.

As shown in FIG. 22, in order to reduce timing jitter of a synchronous optical beat signal, it is better to make a loop band as wide as possible. Limiting factors of the loop band are a phase delay due to the loop length as well as phase delays of the optical phase detector 10, the loop filter 20 and the OVCO 30, which are components of the synchronous optical signal generating device 1. The loop length is among the most significant factor of the phase delay. This is because the phase delays of the optical phase detector 10 and the loop filter 20 can be controlled by design of an electronic circuit, and the phase delay of the OVCO 30 is mainly due to a response band of the VCO 31 and the band can be 1 MHz or more.

Figure 23:
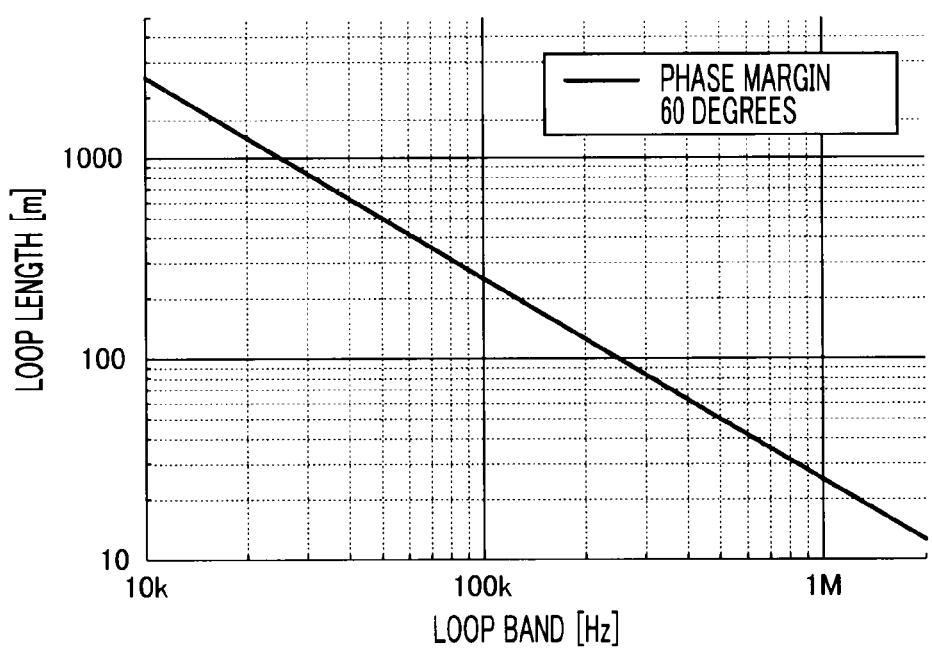
FIG. 23 shows dependence of a loop length on a loop band when a phase margin is 60 degrees and a phase delay is caused solely by the loop length.

With reference to the relation shown in FIG. 23, it is better to make the loop length as short as possible so that the loop band can be a wide band. If a synchronous beat light source is operated by a designed loop band, a loop length may be at least designed to be shorter than the loop length shown in FIG. 23. As shown in FIG. 23, even when the loop band is a wide band of 1 MHz, the synchronous optical signal generating device 1 can be configured using a fiber optical system because the upper limit of the loop length exceeds 10 m.

On the other hand, it is better to make the loop length, which is allowable in manufacturing the synchronous optical signal generating device 1, as long as possible. The upper limit of the loop length depends upon the required loop band. The narrower the loop band, the larger the upper limit of the loop length. In order to make the loop band narrow while maintaining the timing jitter of the synchronous optical beat signal, it is preferable that a line width of the optical beat signal outputted by the OVCO 30 is small. This is because the required loop band is 40 times or more as large as the line width of the optical beat signal.

A key factor for determining the line width of the optical beat signal outputted by the OVCO 30 is the VCO 31 and a repetition frequency of the optical beat signal. If the repetition frequency of the optical beat signal is N times (N is an integer) as large as that of an electrical signal which drives the optical modulator (LN phase modulator 332), the line width of the optical beat signal is N times as large as the line width of the VCO 31. The line width of the VCO 31 is normally below 10 kHz. Accordingly, the line width of the optical comb signal also becomes small, and the line width of the optical beat signal also becomes small. Therefore, if the loop band of the synchronous optical signal generating device 1 is in the order of 1 MHz, the synchronous optical signal generating device 1 can generate an optical beat signal with a small timing jitter, and the upper limit of the loop length exceeds 10 m. In addition, it is preferable that the loop length is designed to be short so that a phase delay due to the loop length itself is less than 30 degrees.

As described above, according to the present embodiment, since optical spectrum lines of wavelengths λ1 and λ2 are selected from the optical comb signal generated based on an electrical signal having a narrow line width, and then multiplexed to generate an optical beat signal which has a narrow line width and which is synchronized with a reference optical signal, it is possible to make a loop band narrow and to reduce a phase noise and a timing jitter. Moreover, since the synchronous operation is performed based on PLL technique and the loop band is as narrow as 1 MHz or less, it is possible to allow an appropriate loop length to such a degree that the synchronous optical signal generating device 1 can be manufactured (packaged) using the fiber optical system. Further, there is no need to enhance a power of an optical signal to be inputted into the optical phase detector 10, thereby reducing the power consumption.

If the loop band is 10 kHz or more, the timing jitter of the synchronous optical beat signal can be reduced as low as practicable. Even if a reference optical signal has a high bit rate of 40 Gbps, it is possible to synchronize the optical beat signal with the reference optical signal, and to generate a synchronous optical beat signal having a repetition frequency that can exceed 40 Gbps with a timing jitter as low as practicable.

Further, it is possible to easily realize a configuration of an optical modulator by the LN phase modulator 332, and to generate an optical comb signal by phase modulation of laser light.

Moreover, since the 2-mode selector 34 includes passive elements (optical filters 342a and 342b), power consumption can be reduced. Examples of the optical filter used for the passive element include an optical filter that reflects or transmits only a specific wavelength. Examples of such an optical filter include an optical filter using a dielectric multilayer filter, an FBG (fiber bragg grating) or an etalon filter.

Furthermore, since the optical signal having the wavelength $\lambda 1$ and the optical signal having the wavelength $\lambda 2$ can easily be selected and obtained by filtering the optical comb signal, it is possible to readily multiplex the respective signals.

Modified Examples

Modified examples of the above embodiment will be described with reference to FIGS. 5 to 11. In the modified examples, modified examples of the optical phase detector 10, the loop filter 20 and the OVCO 30, which constitute the synchronous optical signal generating device 1, will be described.

First, a modified example of the optical phase detector 10 will be described. An optical phase detector is not limited to an optical phase detector using two-photon absorption. Examples of optical phase detectors include an optical phase detector using four wave mixing (FWM) in an optical fiber. The optical phase detector using FWM extracts FWM light, which is newly generated by FWM, using an optical filter, and converts the light into an electric current by a photodiode to output a phase error signal. The optical phase detector utilizing FWM, for example, uses a nonlinear medium such as an HNLF (highly nonlinear fiber), and an SOA (semiconductor optical amplifier).

Another example of an optical phase detector includes an optical phase detector using cross phase modulation (XPM) in an optical fiber. In the optical phase detector using XPM, a wavelength of an optical signal is shifted by XPM. The optical phase detector extracts XPM light having the shifted wavelength by an optical filter, and converts the light into an electric current by a photodiode to output a phase error signal.

Still another example of an optical phase detector includes an optical phase detector using second harmonic generation (SHG) in a nonlinear optical crystal. The optical phase detector using SHG extracts SHG light by an optical filter and converts the light into an electric current to output a phase error signal.

Still another example of an optical phase detector includes an optical phase detector using SHG in periodically poled lithium niobate (PPLN). The optical phase detector using SHG in PPLN extracts SHG light by an optical filter and converts the light into an electric current by a photodiode to output a phase error signal. Another example may include an optical phase detector using PMT (photo multiplier tube) or a Kerr effect.

Figure 5:
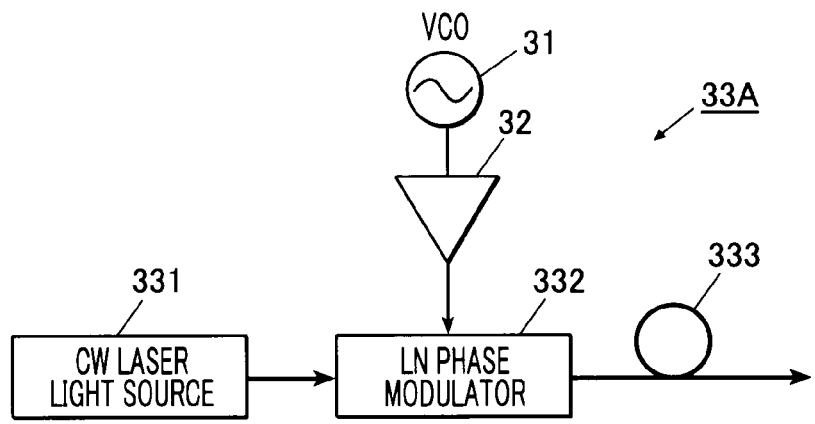
FIG. 5 shows an internal configuration of an optical comb generator.
Figure 6:
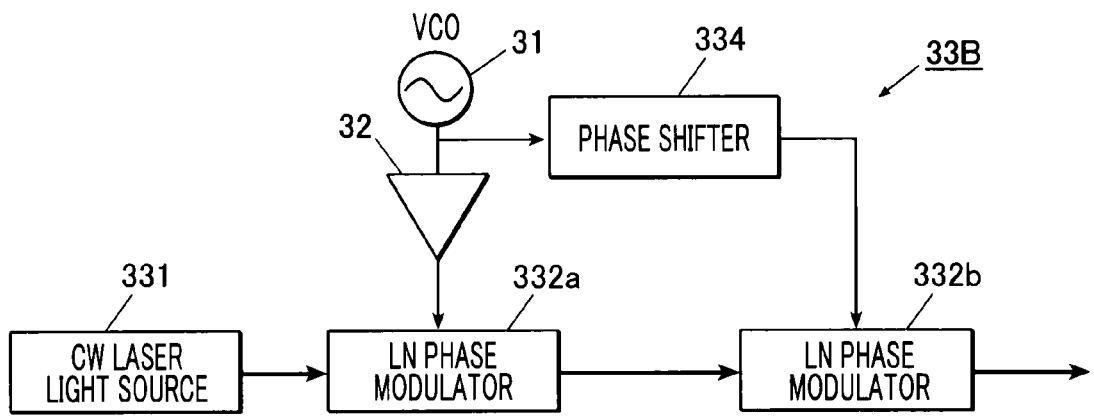
FIG. 6 shows an internal configuration of an optical comb generator.

Next, a modified example of the OVCO 30 will be described. With reference to FIGS. 5 and 6, modified examples of the optical comb generator 33 of the OVCO 30 will be described. FIG. 5 shows an internal configuration of an optical comb generator 33A. FIG. 6 shows an internal configuration of an optical comb generator 33B.

An optical comb generator is not limited to the optical comb generator 33 using a phase modulator (LN phase modulator 332). Examples of optical comb generators include an optical comb generator using an optical intensity modulator (optical intensity modulating means). For example, an LN intensity modulator utilizing lithium niobate is used. The optical intensity modulator generates a plurality of optical spectrum lines (optical comb signal) whose frequency intervals on a frequency axis are equal to the frequency of the electrical signal outputted by the VCO 31 (RF amplifier 32), and outputs the generated optical comb signal.

Another example of an optical comb generator includes an optical comb generator in which an output of an optical phase modulator or an optical intensity modulator is inputted into a nonlinear medium. With this structure, the optical comb generator can obtain an optical comb signal having a wider band than obtained by the optical phase modulator or optical intensity modulator without the nonlinear medium. Such an optical comb generator is exemplified by the optical comb generator 33A as shown in FIG. 5. The optical comb generator 33A includes the CW laser light source 331, the LN phase modulator 332 and an HNLF 333 as the nonlinear medium.

An optical spectrum band of an optical comb signal is widened by the HNLF 333. A total fiber length constituting a loop including an optical fiber length of the HNLF 333 is shorter than a fiber length allowable for realizing a loop band set by a user out of loop bands restricted by the VCO 31 (e.g. 1 to 5 MHz or less). The fiber length of the HNLF 333 can be shortened to meet such a condition for the total fiber length. It is preferable that the optical comb generator 33A amplifies an output optical signal from the LN phase modulator 332 by an erbium doped optical fiber amplifier (EDFA), and thereafter inputs the amplified signal into the HNLF 333. An optical comb generator using a photonic crystal fiber as the nonlinear medium may also be employed.

Still another example of an optical comb generator includes an optical comb generator in which optical intensity modulators or optical phase modulators are provided in multiple stages. With this structure, an optical spectrum band can be wider than that when using a single optical intensity modulator or a single optical phase modulator. Such an optical comb generator is exemplified by the optical comb generator 33B shown in FIG. 6. The optical comb generator 33B includes the CW laser light source 331, LN phase modulators 332a and 332b, and a phase shifter 334.

The LN phase modulator 332a is the same as the LN phase modulator 332. The phase shifter 334 shifts a phase of an electrical signal inputted from the VCO 31 by a predetermined amount, and outputs the phase-shifted electrical signal. The LN phase modulator 332b modulates a phase of an optical comb signal inputted from the LN phase modulator 332a based on the electrical signal inputted from the phase shifter 334, and outputs an optical comb signal having a widened optical spectrum band. The optical comb generator 33B generates a plurality of optical spectrum lines whose frequency intervals on a frequency axis are equal to a frequency of the inputted electrical signal. In this case, an optical spectrum band is wider than that when using a single optical intensity modulator or a single optical phase modulator. It is noted that the phase shifter 334 is required for adjusting the phase of the electrical signal (RF signal) to be inputted into the LN phase modulator 332a so that the optical spectrum band becomes a wide band. The number of the LN phase modulators (optical phase modulators or optical intensity modulators) is not limited to two, but may be three or more.

Figure 7:
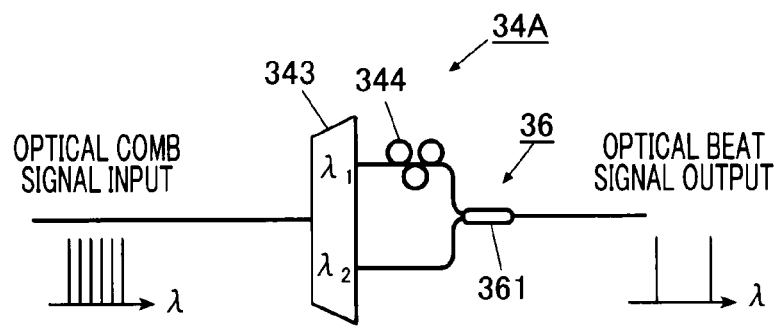
FIG. 7 shows configurations of a 2-mode selector and a 2-mode multiplexer.
Figure 8:
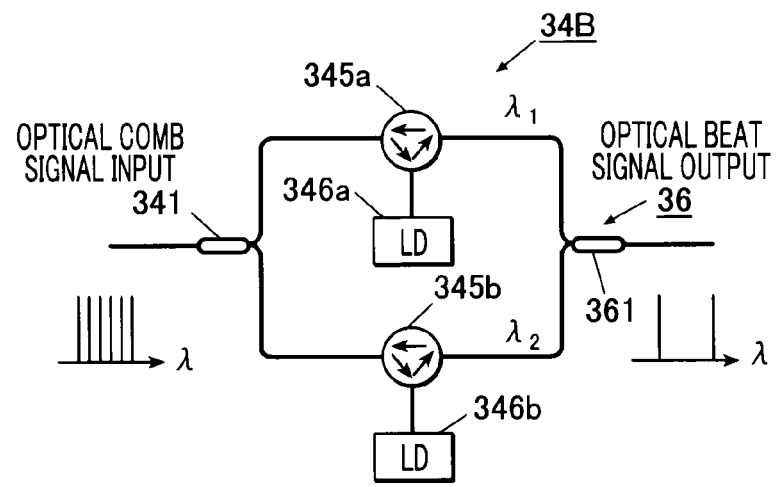
FIG. 8 shows configurations of a 2-mode selector and a 2-mode multiplexer.
Figure 9:
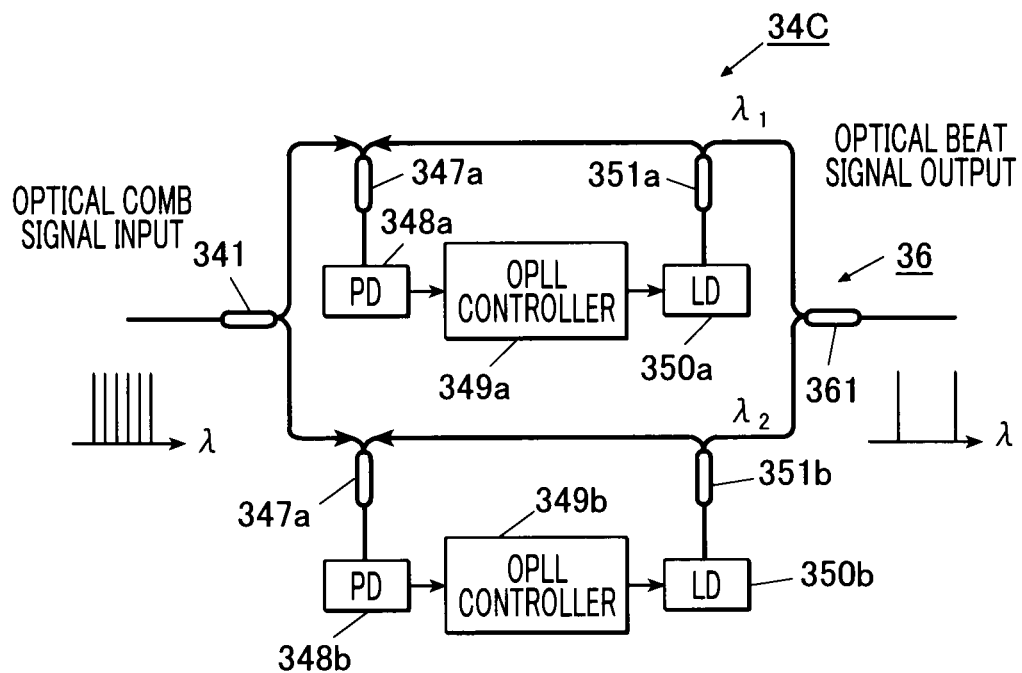
FIG. 9 shows configurations of a 2-mode selector and a 2-mode multiplexer.
Figure 10:
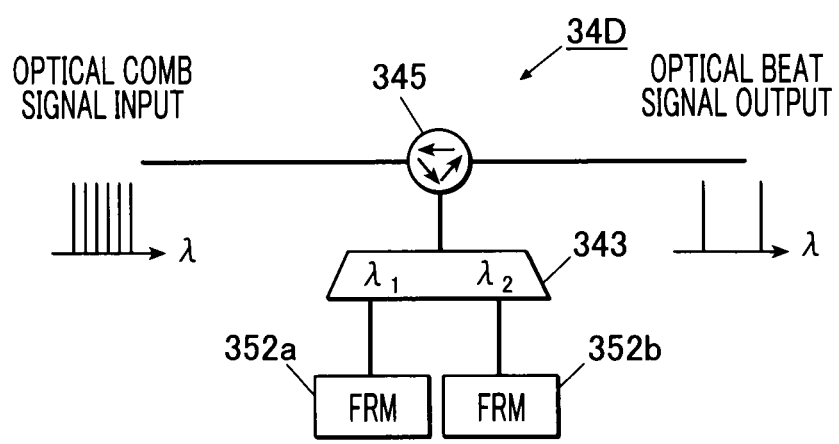
FIG. 10 shows a configuration of a 2-mode selection multiplexer.
Figure 11:
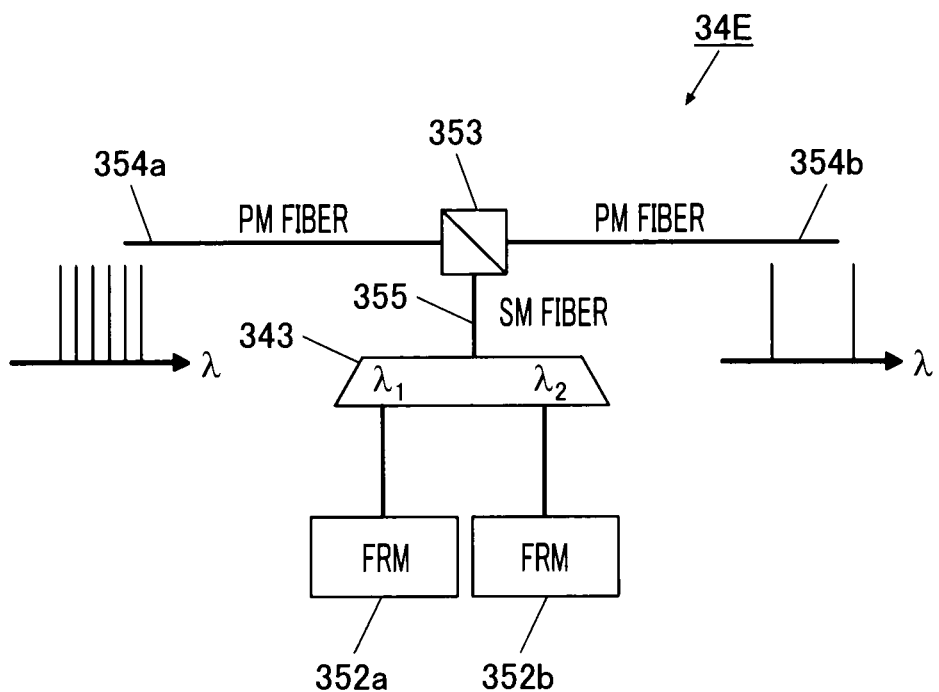
FIG. 11 shows a configuration of a 2-mode selection multiplexer.

Next, with reference to FIGS. 7 to 11, modified examples of the 2-mode selector 34 and the 2-mode multiplexer 36 will be described. FIG. 7 shows configurations of a 2-mode selector 34A and the 2-mode multiplexer 36. FIG. 8 shows configurations of a 2-mode selector 34B and the 2-mode multiplexer 36. FIG. 9 shows configurations of a 2-mode selector 34C and the 2-mode multiplexer 36. FIG. 10 shows a configuration of a 2-mode selection multiplexer 34D. FIG. 11 shows a configuration of a 2-mode selection multiplexer 34D.

Examples of 2-mode selectors are not limited to the 2-mode selector 34 using the optical filters 342a and 342b. Examples of 2-mode selectors include a 2-mode selector using FBGs (fiber bragg gratings). As with the 2-mode selector 34, the 2-mode selector using FBGs has two FBGs, and optical comb signals divided by the divider 341 are inputted into the respective FBGs, and an optical signal having a desired wavelength $\lambda 1$ and an optical signal having a desired wavelength $\lambda 2$ are outputted. The two FBGs are adjusted so as to match the polarizations of the optical signal having the wavelength $\lambda 1$ and the optical signal having the wavelength $\lambda 2$.

Another example of a 2-mode selector includes a 2-mode selector using an AWG (arrayed waveguide granting). The AWG splits input light into optical spectrums with predetermined frequency intervals, and outputs the light. Such a 2-mode selector is exemplified by the 2-mode selector 34A shown in FIG. 7. The 2-mode selector 34A includes an AWG 343 and a PC (polarization controller) 344 as polarization adjusting means. If a prescribed frequency of the AWG 343 is equal to each of the frequency intervals of the optical comb signal, it is possible to select each of a plurality of optical spectrum lines of the optical comb signal which is inputted from the optical comb generator.

The AWG 343 outputs two optical spectrum lines (an optical signal having a wavelength $\lambda 1$ and an optical signal having a wavelength $\lambda 2$) to be required out of the selected optical spectrum lines. The PC 344 is provided at one of the output stages (on the output side for the optical signal having the wavelength $\lambda 1$ in FIG. 7). The PC 344 adjusts the polarization of one of the optical signals (the optical signal having the wavelength $\lambda 1$) so as to match the polarizations of the optical signal having the wavelength $\lambda 1$ and the optical signal having the wavelength $\lambda 2$, and outputs the adjusted optical signal. The two optical signals whose polarizations match interfere with each other in the multiplexer 361, and are outputted as an optical beat signal.

Still another example of a 2-mode selector includes a 2-mode selector that controls wavelengths of two LDs using an OIL (optical injection-lock) technique. Such a 2-mode selector is exemplified by the 2-mode selector 34B shown in FIG. 8. The 2-mode selector 34B includes circulators 345a and 345b, and LDs 346a and 346b as second and third laser light sources. The circulator 345a outputs one of the two optical comb signals divided by the divider 341 to the LD 346a, and outputs an optical signal having a wavelength $\lambda 1$ inputted from the LD 346a, to the multiplexer 361. The circulator 345b outputs the other of the two optical comb signals divided by the divider 341 to the LD 346b, and outputs an optical signal having a wavelength $\lambda 2$ inputted from the LD 346b, to the multiplexer 361.

Emission wavelengths of the LDs 346a and 346b are set respectively to the desired wavelengths $\lambda 1$ and $\lambda 2$ which are selected from the optical comb signal. The LD 346a generates monochromatic light having the wavelength $\lambda 1$ whose phase is synchronized with that of an optical signal having an optical spectrum line of the wavelength $\lambda 1$ in the injected optical comb signal, and outputs the generated light. Similarly, the LD 346b generates monochromatic light having the wavelength $\lambda 2$ whose phase is synchronized with that of an optical signal having an optical spectrum line of the wavelength $\lambda 2$ in the injected optical comb signal, and outputs the generated light. The optical signal having the wavelength $\lambda 1$ and the optical signal having the wavelength $\lambda 2$ respectively outputted from the LDs 346a and 346b are multiplexed in the multiplexer 361, and the multiplexed signal is outputted as an optical beat signal.

The minimum value of frequency intervals when extracting one wavelength from an optical comb signal by using an optical filter depends upon a band of the optical filter. For example, it is difficult to extract light having one wavelength from an optical comb signal with frequency intervals of 10 GHz by using a commercially available optical filter because the signal band is too wide. On the other hand, in a 2-mode selector using a semiconductor LD, such as the 2-mode selector 34B, one wavelength can easily be extracted even if the frequency intervals become as small as several hundreds of MHz, for example.

In the 2-mode selector 34B, each of the LDs 346a and 346b outputs light that is phase-synchronized with light having a desired wavelength owing to the OIL technique. When light having the desired wavelength is injected from each output section of the LDs 346a and 346b, the injected light is optically synchronized in a LD chip, and light that is phase-synchronized with the injected light is outputted from the LD. In this OIL technique, since a wavelength difference range (lock-in range) in which the synchronous operation can be started is in the order of several tens of MHz, the band of the 2-mode selector 34B is as narrow as that of a filter for extracting light having one wavelength from an optical comb signal.

Still another example of a 2-mode selector includes a 2-mode selector which controls wavelengths of two LDs using an OPLL technique. Such a 2-mode selector is exemplified by the 2-mode selector 34C shown in FIG. 9. The 2-mode selector 34C includes the divider 341, multiplexers 347a and 347b, PDs 348a and 348b, OPLL controllers 349a and 349b, LDs 350a and 350b, and dividers 351a and 351b. The multiplexer 347a, the PD 348a, the OPLL controller 349a, the LD 350a, and the divider 351a constitute one phase-locked loop (OPLL) (first phase-locked loop means). The multiplexer 347b, the PD 348b, the OPLL controller 349b, the LD 350b, and the divider 351b constitute another phase-locked loop (second phase-locked loop means). Emission wavelengths of the LDs 350a and 350b are set to the desired wavelengths $\lambda 1$ and $\lambda 2$, respectively, each of which is selected from an optical comb signal. The multiplexers 347a and 347b and the dividers 351a and 351b include optical couplers or the like.

Each of the optical comb signals which are obtained by the divider 341 is used as reference light in the OPLL. The multiplexer 347a multiplexes one of the optical comb signals inputted from the divider 341 with the optical signal having the wavelength $\lambda 1$ inputted from the divider 351a, and outputs the multiplexed signal. The PD 348a receives the optical signal inputted from the multiplexer 347a, and converts the received signal into an electrical signal corresponding to a phase error to output the converted signal. The OPLL controller 349a drives the LD 350a in synchronous with the optical comb signal according to the electrical signal inputted from the PD 348a. The LD 350a generates monochromatic light having the wavelength λ1 whose phase is synchronized with an optical signal having the desired optical spectrum line in the optical comb signal under the control of the OPLL controller 349a, and outputs the generated light. The divider 351a divides the optical signal having the wavelength λ1 inputted from the LD 350a into two signals. The divider 351a outputs one of the signals to the multiplexer 347a and outputs the other of the signals to the multiplexer 361.

Similarly, the multiplexer 347b multiplexes the other of the optical comb signals inputted from the divider 341 with the optical signal having the wavelength λ2 inputted from the divider 351b, and outputs the multiplexed signal. The PD 348b receives the optical signal inputted from the multiplexer 347b, and converts the received signal into an electrical signal corresponding to a phase error to output the converted signal. The OPLL controller 349b drives the LD 350b in synchronous with the optical comb signal according to the electrical signal inputted from the PD 348b. The LD 350b generates monochromatic light having the wavelength λ2 under the control of the OPLL controller 349b, and outputs the generated light. The divider 351b divides the optical signal having the wavelength λ2 inputted from the LD 350b into two signals. The divider 351b outputs one of the signals to the multiplexer 347b, and outputs the other of the signals to the multiplexer 361. The multiplexer 361 multiplexes the optical signal having the wavelength λ1 outputted from the multiplexer 347a with the optical signal having the wavelength λ2 outputted from the multiplexer 347b, and outputs the multiplexed signal as an optical beat signal.

In the 2-mode selector 34C, by using the OPLL technique, a phase error between light having one wavelength in the optical comb signal and light having an output wavelength of the LD 350a is detected, and the phase error signal is fed back to the LD 350a by the PD 348a and the OPLL controllers 349a so that a phase of the output light of the LD 350a is synchronized with that of light having the desired wavelength (frequencies are the same). Similarly, a phase error between light having one wavelength in the optical comb signal and light having an output wavelength of the LD 350b is detected, and the phase error signal is fed back to the LD 350b by the PD 348b and the OPLL controllers 349b so that a phase of the output light of the LD 350b is synchronized with that of light having the desired wavelength (frequencies are the same). Therefore, as with the 2-mode selector 34C using the OIL, in the 2-mode selector 34B using the OPLL, since a wavelength difference range (lock-in range) in which the synchronous operation can be started is in the order of several tens of MHz, the band of the 2-mode selector 34C is as narrow as that of a filter for extracting light having one wavelength from an optical comb signal.

The 2-mode selector and the 2-mode multiplexer may be integrated and configured as a 2-mode selection multiplexer. An example of the 2-mode selection multiplexer includes the 2-mode selection multiplexer 34D shown in FIG. 10. The 2-mode selection multiplexer 34D includes a circulator 345, the AWG 343, and FRMs (Faraday rotator mirrors) 352a and 352b.

The circulator 345 outputs the optical comb signal inputted from the optical comb generator to the AWG 343. The circulator 345 also outputs an optical signal inputted from the AWG 343 as an optical beat signal. The optical signal inputted from the AWG 343 is obtained by multiplexing an optical signal having a wavelength λ1 with an optical signal having a wavelength λ2. The AWG 343 splits the optical comb signal inputted from the circulator 345 into different optical spectrum lines, and inputs optical signals having two different desired optical spectrum lines (the optical signal having a wavelength λ1 and the optical signal having a wavelength λ2) into the FRMs 352a and 352b, respectively.

The FRM 352a receives the optical signal having the wavelength λ1 from the AWG 343, and outputs an optical signal having a wavelength λ1 orthogonal to the received optical signal. The FRM 352b receives the optical signal having the wavelength λ2 from the AWG 343, and outputs an optical signal having a wavelength λ2 orthogonal to the received optical signal. The AWG 343 multiplexes the optical signal having the wavelength λ1 inputted from the FRM 352a with the optical signal having the wavelength λ2 inputted from the FRM 352b, and outputs the multiplexed signal to the circulator 345.

A polarization of the optical signal having the wavelength λ1 inputted from the FRM 352a into the AWG 343 and a polarization of the optical signal having the wavelength λ2 inputted from the FRM 352b into the AWG 343 match, as with the optical signal having the wavelength λ1 and the optical signal having the wavelength λ2 which are outputted from the AWG 343. Therefore, the 2-mode selection multiplexer 34D is characterized in that an optical SNR (signal-to-noise ratio) increases (frequency purity increases) because the polarization purity of the optical beat signal can be enhanced without a polarization controller, and the optical signals having two different desired optical spectrum lines pass through the AWG 343 twice. In order to increase the optical SNR of the optical beat signal to be outputted, reduction in reflection from an unused optical port terminal of the AWG 343 is required. For the reduction, an APC (angled physical contact) connector or a non-reflective terminal is used at the optical port terminal. When the reflection is not reduced sufficiently even if the APC connector is provided at the optical port terminal, grease or the like may be applied on the end surface of the APC connector to reduce the reflection.

Another example of a 2-mode selection multiplexer includes a 2-mode selection multiplexer 34E shown in FIG. 11. The 2-mode selection multiplexer 34E includes a PBC (polarization beam combiner) 353 as polarization synthesizing means, the AWG 343, the FRMs 352a and 352b, PM fibers (polarization maintaining optical fibers) 354a and 354b, and an SM fiber (single mode optical fiber) 355.

The PBC 353 is connected to the optical comb generator 33 through the PM fiber 354a. The PBC 353 is connected to the optical phase detector 10 and to the outside through the PM fiber 354b. Further, the PBC 353 is connected to the AWG 343 through the SM fiber 355. The PBC 353 maintains a polarization of an optical comb signal inputted from the optical comb generator 33 through the input-side PM fiber 354a, and outputs the optical comb signal to the SM fiber 355. The PBC 353 outputs an optical signal that is inputted from the AWG 343 through the SM fiber 355, to the output-side PM fiber 354b.

The operation of the 2-mode selection multiplexer 34E will be described. The polarization of the optical comb signal outputted from the optical comb generator 33 is maintained by the input-side PM fiber 354a, and the optical comb signal is inputted into the PBC 353. The optical comb signal is outputted from the PBC 353 and inputted into the AWG 343 through the SM fiber 355. An optical signal having an optical spectrum line of a wavelength λ1 and an optical signal having an optical spectrum line of a wavelength λ2 are selected from the inputted optical comb signal by the AWG 343, and are inputted into the FRBs 352a and 352b, respectively. The optical signal having the wavelength λ1 reflected at the FRB 352a and the optical signal having the wavelength λ2 reflected at the FRB 352b are multiplexed in the AWG 343. The multiplexed optical signal is inputted into the PBC 353 through the SM fiber 355. Since the optical signals (the optical signal having the wavelength λ1 and the optical signal having the wavelength λ2) whose polarizations are rotated by 90 degrees are reflected at the FRBs 352a and 352b, respectively, the reflected optical signals are subjected to the action of polarization variation that is opposite from when passing through the SM fiber 355 last time, and then arrive at the PBC 353.

The multiplexed optical signal inputted into the PBC 353 again is outputted as the optical beat signal to the outside and the optical phase detector 10 under a condition that the polarization of the signal, which is different from the initial polarization by 90 degrees, is maintained by the PM fiber 354b. Although the polarization-maintaining-type AWG is generally not commercially available, it is possible to easily input and output the signal with the polarization maintained, by employing the 2-mode selection multiplexer 34E.

The present modified examples have the same effect as the above embodiments. Further, according to the optical comb generator 33A, it is possible to widen an optical spectrum band of an optical comb signal by the HNLF 333, and also reduce the length of the HNLF 333.

According to the optical comb generator 33B, it is possible to widen an optical spectrum band of an optical comb signal.

According to the 2-mode selector 34A, it is possible to readily select an optical signal having a wavelength λ1 and an optical signal having a wavelength λ2 from an optical comb signal by the AWG 343, and readily match polarizations of the two optical signals by the PC 344. Therefore, the optical signal having the wavelength λ1 and the optical signal having the wavelength λ2 can easily interfere with each other.

According to the 2-mode selection multiplexers 34D and 34E, it is possible to readily select an optical signal having a wavelength λ1 and an optical signal having a wavelength λ2 from an optical comb signal, and readily match polarizations of the two optical signals by the AWG 343 and the FRMs 352a and 352b. Therefore, the optical signal having the wavelength λ1 and the optical signal having the wavelength λ2 can easily interfere with each other without polarization adjusting means. Moreover, since the polarization purity of the optical beat signal can be enhanced without a polarization controller, and the optical signal having the wavelength λ1 and the optical signal having the wavelength λ2 pass thorough the AWG 343 twice, it is possible to enhance the frequency purity of the optical beat signal. Furthermore, according to the 2-mode selection multiplexer 34E, it is possible to readily input and output the signal with the polarization maintained in the 2-mode selection and multiplexing.

Further, since the AWG 343 splits the optical comb signal at frequency intervals corresponding to frequency intervals of the optical comb signal, it is possible to select the optical signal having the wavelength λ1 and the optical signal having the wavelength λ2 from the optical comb signal more easily.

Further, since each of the 2-mode selectors 34A, 34D and 34E includes a passive element, it is possible to reduce power consumption.

According to the 2-mode selector 34B, it is possible to generate optical signals having different wavelengths λ1 and λ2 from one another by the LDs 346a and 346b using the optical comb signal as excitation light, and readily multiplex the optical signal having the wavelength λ1 with the optical signal having the wavelength λ2. In addition, requirement for frequency intervals of the optical comb signal is loosened, and it is possible to make the frequency intervals small.

According to the 2-mode selector 34C, it is possible to generate optical signals having different wavelengths λ1 and λ2 from one another based on the optical comb signal by the first phase-locked loop means (the multiplexer 347a, the PD 348a, the OPLL controller 349a, the LD 350a, the divider 351a) and the second phase-locked loop means (the multiplexer 347b, the PD 348b, the OPLL controller 349b, the LD 350b, the divider 351b), and readily multiplex the optical signal having the wavelength λ1 with the optical signal having the wavelength λ2. In addition, requirement for frequency intervals of the optical comb signal is loosened, and it is possible to make the frequency intervals small.

Example 1

Figure 12:
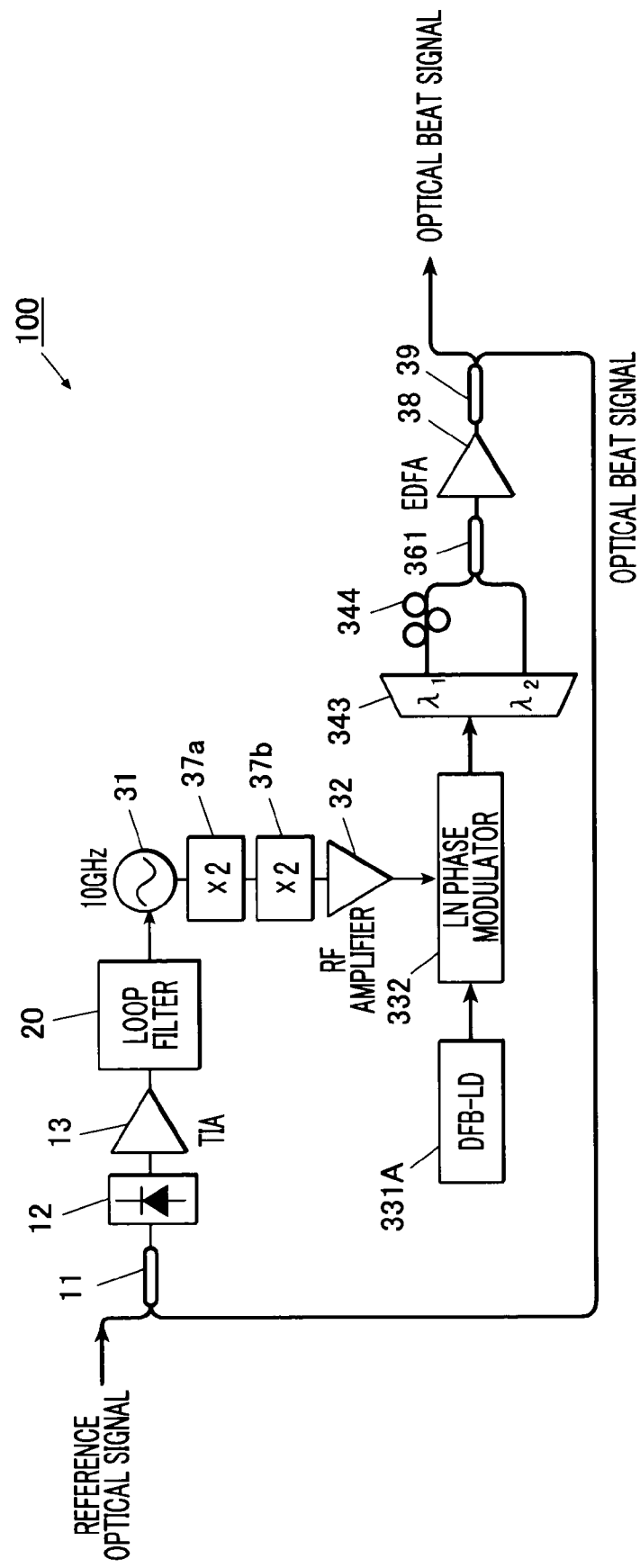
FIG. 12 shows a configuration of a synchronous optical signal generating device according to an Example 1 of the present invention.

With reference to FIG. 12, one specific example of the above embodiments and the modified examples will be described. FIG. 12 shows a configuration of a synchronous optical signal generating device 100 of the present example.

As shown in FIG. 12, the synchronous optical signal generating device 100 includes a multiplexer 11 as first multiplexing means, a Si-APD 12 as phase comparing means, a TIA (transimpedance amplifier) 13, a loop filter 20, a VCO 31, double frequency generators 37a and 37b as frequency increasing means, an RF amplifier 32, a DFB (distributed feedback)-LD 331A as a first laser light source, an LN phase modulator 332, an AWG 343, a PC 344, a multiplexer 361, an EDFA 38 and a divider 39. The multiplexer 11, the Si-APD 12, and the TIA 13 are examples of the optical phase detector 10. The VCO 31, the double frequency generators 37a and 37b, the RF amplifier 32, the DFB-LD 331A, the LN phase modulator 332, the AWG 343, the PC 344, the multiplexer 361, the EDFA 38, and the divider 39 are examples of the OVCO 30. The DFB-LD 331A and the LN phase modulator 332 are examples of the optical comb generator 33. The AWG 343 and the PC 344 correspond to the 2-mode selector 34A. The multiplexer 361 corresponds to the 2-mode multiplexer 36.

The synchronous optical signal generating device 100 generates a synchronous optical beat signal of 160 GHz. The multiplexer 11 includes an optical coupler or the like, multiplexes a reference optical signal with an optical beat signal inputted from the divider 39, and outputs the multiplexed signal. The Si-APD 12 receives the multiplexed optical signal inputted from the multiplexer 11, and outputs a phase error signal as an electrical signal. The TIA 13 converts the phase error signal inputted from the Si-APD 12 into a voltage signal, amplifies the converted signal, and outputs the amplified signal. The loop filter 20 shapes the phase error signal inputted from the TIA 13, and outputs the shaped signal.

The VCO 31 generates an electrical signal in accordance with the phase error signal outputted from the loop filter 20, and outputs the generated signal. The double frequency generator 37a generates an electrical signal having a frequency twice as large as that of the electrical signal inputted from the VCO 31, and outputs the generated signal. The double frequency generator 37b generates an electrical signal having a frequency twice as large as that of the electrical signal inputted from the double frequency generator 37a, and outputs the generated signal. The RF amplifier 32 amplifies the electrical signal inputted from the double frequency generator 37b, and outputs the amplified signal.

The DFB-LD 331A outputs laser light having a single frequency. The LN phase modulator 332 modulates a phase of the laser light inputted from the DFB-LD 331A, generates an optical comb signal having optical spectrum lines with frequency intervals of the electrical signal inputted from the RF amplifier 32, and outputs the generated optical comb signal. The AWG 343 selects an optical signal having an optical spectrum line of a wavelength λ1 and an optical signal having an optical spectrum line of a wavelength λ2 from the optical comb signal inputted from the LN phase modulator 332, and outputs the selected signals. The PC 344 adjusts a polarization of the optical signal having the wavelength λ1 inputted from the AWG 343, and outputs the adjusted signal. The multiplexer 361 multiplexes the optical signal having the wavelength λ1 inputted from the PC 344 with the optical signal having the wavelength λ2 inputted from the AWG 343, and outputs the multiplexed signal as an optical beat signal.

The EDFA 38 amplifies the optical beat signal inputted from the multiplexer 361, and outputs the amplified signal. As means for the amplification, an SOA or the like may be employed instead of the EDFA. The divider 39 divides the optical beat signal inputted from the EDFA 38 into two signals, outputs one of the divided signals to the multiplexer 11 for feedback, and outputs the other to the outside.

When an oscillation frequency of the VCO 31 is 10 GHz, an oscillation frequency of the double frequency generator 37a is 20 GHz, and an oscillation frequency of the double frequency generator 37b is 40 GHz. A quadruple frequency generator may be used instead of the two double frequency generators 37a and 37b for similar operation. The LN phase modulator 332 generates the optical comb signal having optical spectrum lines with intervals of 40 GHz based on the electrical signal of 40 GHz inputted from the RF amplifier 32. The AWG 343 is designed to be suitable for splitting the optical comb signal having optical spectrum lines with intervals of 40 GHz with respect to each wavelength. The AWG 343 outputs the optical signal having an optical spectrum line of the wavelength λ1 and the optical signal having an optical spectrum line of the wavelength λ2. A frequency difference between the two optical signals is 160 GHz. These two optical signals are multiplexed in the multiplexer 361 to generate the optical beat signal of 160 GHz synchronized with the reference optical signal.

An AWG for intervals of 10 GHz having a high extinction ratio is difficult to manufacture, whereas an AWG for intervals of 40 GHz having an extinction ratio equivalent to that of a commercially available product (intervals of 50, 100 or 200 GHz) can be manufactured at an equivalent cost. Therefore, since an electrical signal of 40 GHz can be outputted by the double frequency generators 37a and 37b, it is possible to provide the AWG 343 at low cost.

The present example has the same effect as the above embodiments and the modified example (2-mode selector 34A). Further, since the double frequency generators 37a and 37b are used, a band of the AWG 343 for extracting optical signals having two different wavelengths from the optical comb signal can be wide, thereby providing the AWG 343 at low cost. Moreover, since the optical beat signal can be amplified by the EDFA 38, it is possible to readily generate the phase error signal by the Si-APD 12.

In the present example, optical filters may be used as the 2-mode selector 34 as shown in the above embodiments (FIG. 4) instead of the AWG 343. A band of an optical filter required for extracting one wavelength from an optical comb signal with intervals of 10 GHz has to be smaller than 0.01 nm. Such an optical filter that meets this requirement has not been commercially available. An optical filter used in research costs too much. On the other hand, a band of an optical filter required for extracting one wavelength from an optical comb signal with intervals of 40 GHz is a wide band of 0.03 nm, thereby lowering the cost of production. Therefore, since an electrical signal of 40 GHz can be outputted by the double frequency generators 37a and 37b, it is possible to provide the optical filter at low cost.

Example 2

Figure 13:
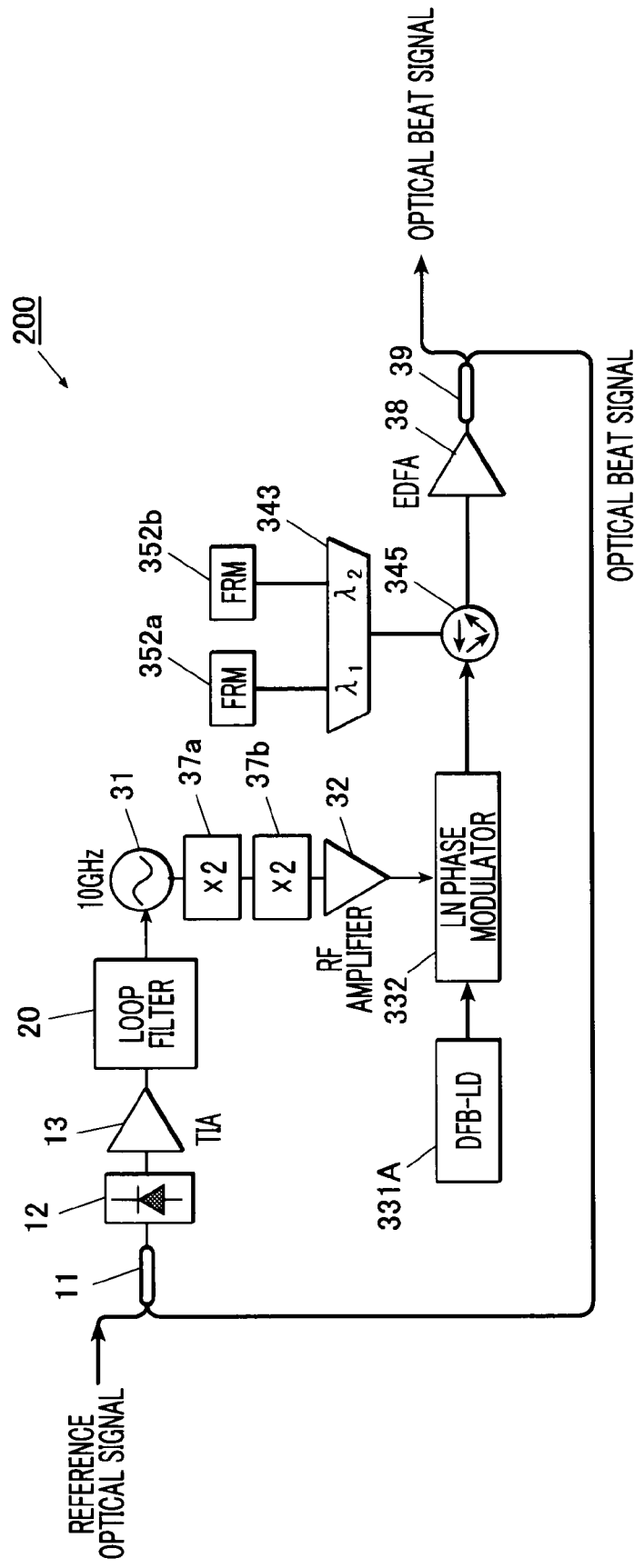
FIG. 13 shows a configuration of a synchronous optical signal generating device according to an Example 2 of the present invention.

With reference to FIGS. 13 to 20, another example of the above embodiments and the modified example will be described. FIG. 13 shows a synchronous optical signal generating device 200 of the present example.

As shown in FIG. 13, the synchronous optical signal generating device 200 includes the multiplexer 11, the Si-APD 12, the TIA 13, the loop filter 20, the VCO 31, the double frequency generators 37a and 37b, the RF amplifier 32, the DFB-LD 331A, the LN phase modulator 332, the circulator 345, the AWG 343, the FRMs 352a and 352b, the EDFA 38, and the divider 39. That is, in the synchronous optical signal generating device 200, the 2-mode selector 34A and the 2-mode multiplexer 36 in the synchronous optical signal generating device 100 are replaced by the 2-mode selection multiplexer 34D, and a detailed description of the operation of the synchronous optical signal generating device 200 will be omitted.

Since the optical signals pass through the AWG 343 twice, it is possible to obtain optical spectrum lines with high wavelength purity as compared with the synchronous optical signal generating device 100. Further, since the circulator 345 and the FRMs 352a and 352b are used, polarizations of two optical signals whose optical spectrum lines are selected by the AWG 343 always match. Therefore, it is possible to output an optical beat signal with high polarization purity without a polarization controller.

Figure 14:
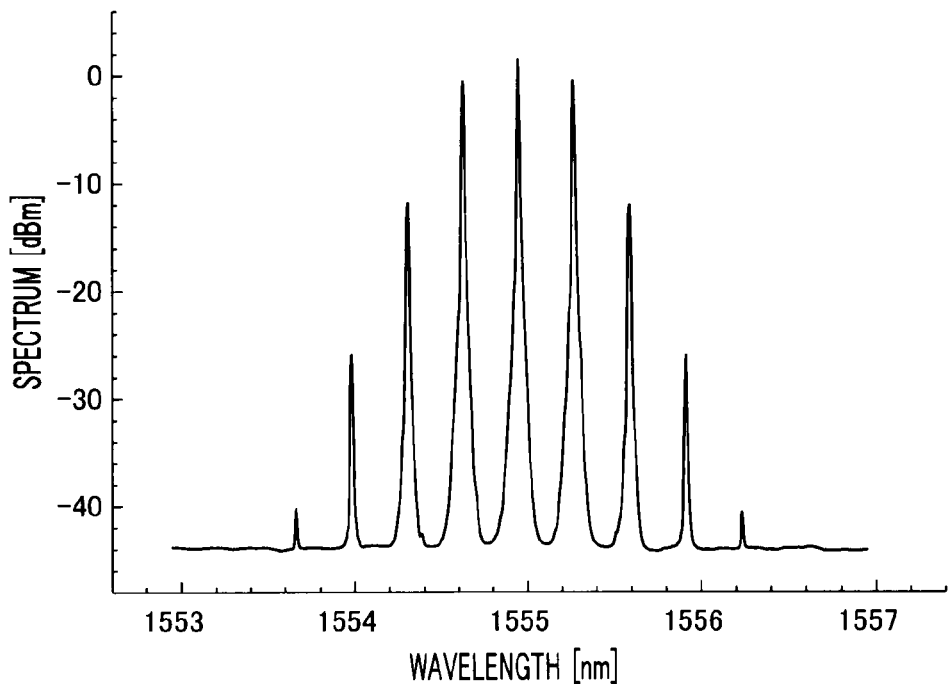
FIG. 14 shows a characteristic of an optical spectrum of an optical signal outputted by an LN phase modulator of the synchronous optical signal generating device.

FIG. 14 shows a characteristic of an optical spectrum of an optical signal outputted by the LN phase modulator 332 in the synchronous optical signal generating device 200. According to the optical spectrum characteristic with respect to a wavelength of the optical signal outputted by the LN phase modulator 332 in the synchronous optical signal generating device 200, FIG. 14 shows that the optical signal having an array of the optical spectrum lines with intervals of 40 GHz is outputted.

Figure 15:
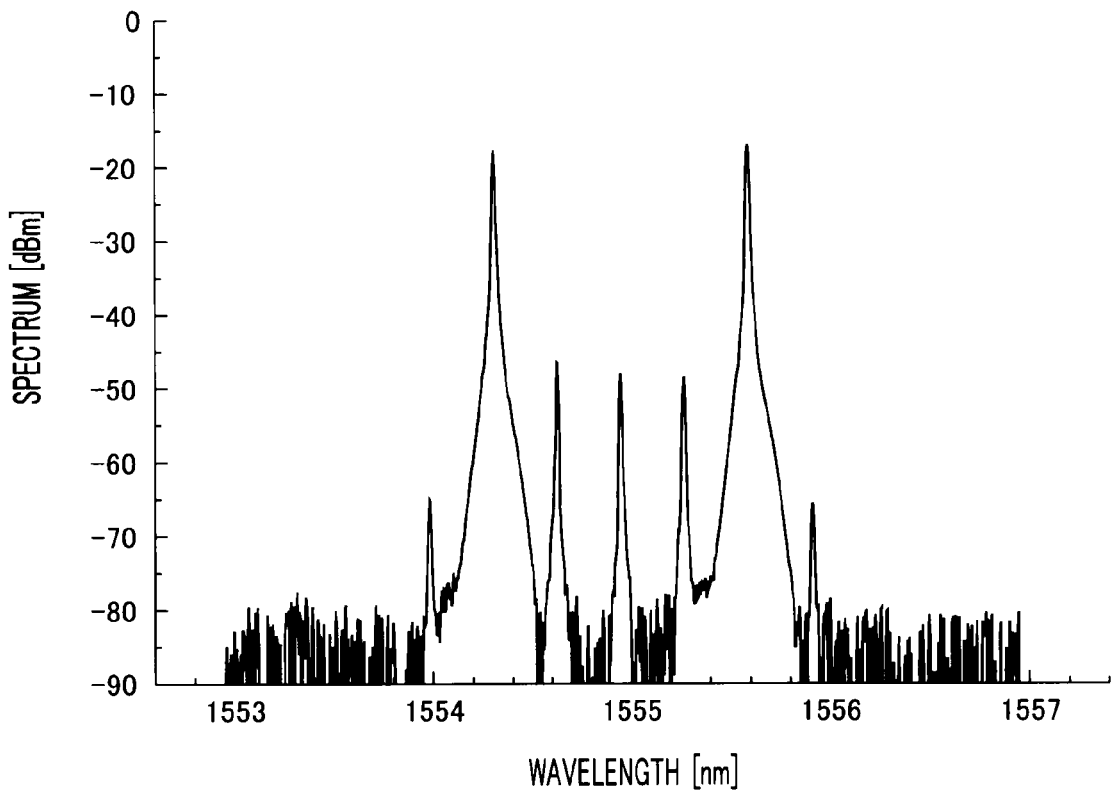
FIG. 15 shows a characteristic of an optical spectrum of an optical signal outputted by a circulator of the synchronous optical signal generating device.

FIG. 15 shows a characteristic of an optical spectrum of an optical beat signal outputted by the circulator 345 in the synchronous optical signal generating device 200. According to the optical spectrum characteristic with respect to a wavelength of the optical beat signal outputted by the circulator 345 in the synchronous optical signal generating device 200, FIG. 15 shows that the optical beat signal having two modes with intervals of 160 GHz is outputted. The OSNR of the circulator 345 in the synchronous optical signal generating device 200 is 30 dB, and the frequency purity of the optical beat signal is high.

Figure 16:
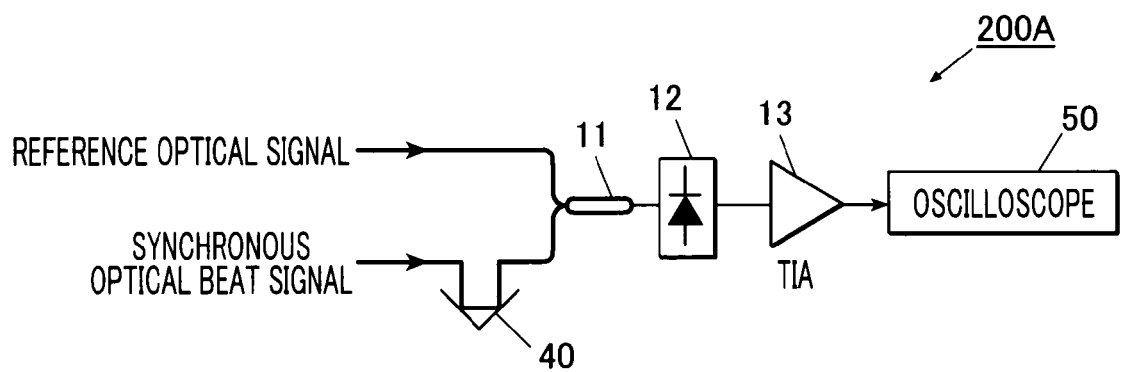
FIG. 16 shows a measurement device for a cross-correlation waveform between an optical beat signal and a reference optical signal in the synchronous optical signal generating device.

FIG. 16 shows a measurement device 200A for a cross-correlation waveform of an optical beat signal and a reference optical signal in the synchronous optical signal generating device 200. Here shown are measurement results of a cross-correlation waveform of a reference optical signal and an optical beat signal of 160 GHz by the measurement device 200A shown in FIG. 16. In the measurement results of FIGS. 16 to 20, power of the optical beat signal of 160 GHz to be inputted into the Si-APD 12 is set to 43.4 mW, and power of the reference optical signal (optical pulse signal of 10 Gbit/s 3 ps) is set to 8.6 mW. A loop band is set to 80 kHz and a total loop length is set to 110 m.

As shown in FIG. 16, the measurement device 200A includes an optical delay line 40, the multiplexer 11, the Si-APD 12, the TIA 13, and an oscilloscope 50. The reference optical signal, which is inputted into the synchronous optical signal generating device 200, is inputted into the multiplexer 11. The optical beat signal outputted from the synchronous optical signal generating device 200 is inputted into the multiplexer 11 through the optical delay line 40. The reference optical signal and the optical beat signal are multiplexed. The optical delay line 40 is inserted in the measurement device 200A for generating a time delay of one of the reference optical signal and the optical beat signal of 160 GHz before multiplexing these signals.

The optical signal multiplexed by the multiplexer 11 is converted into a phase error signal as an electrical signal by the Si-APD 12. The phase error signal is converted into a voltage signal by the TIA 13. The voltage signal outputted from the TIA 13 is inputted into the oscilloscope 50, and a waveform of the signal is measured and displayed. The cross-correlation is obtained by measuring a two-photon absorption current in the Si-APD 12.

Figure 17:
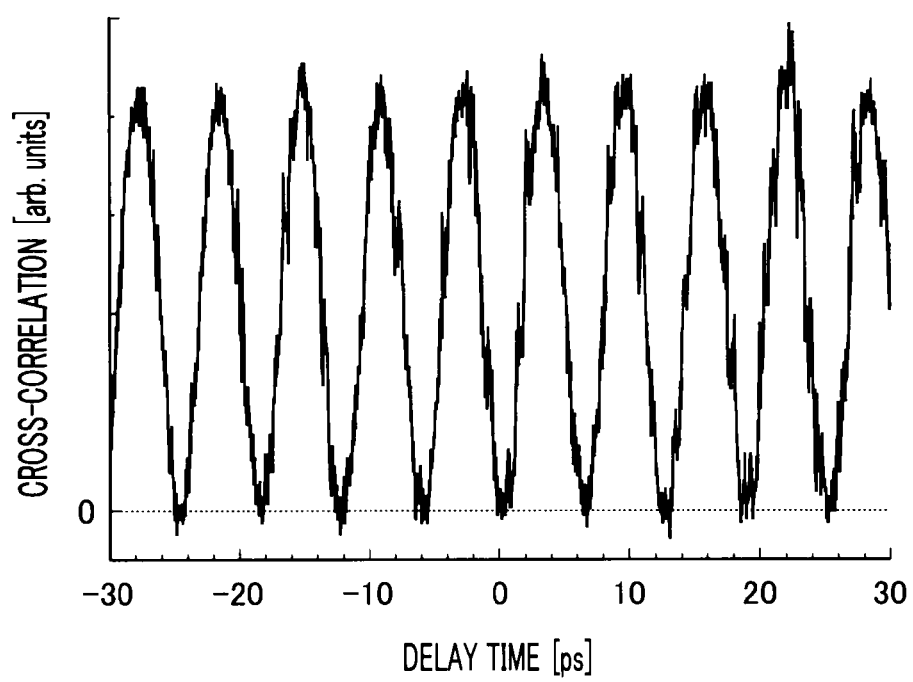
FIG. 17 shows a cross-correlation waveform between an optical beat signal with 160 GHz and a reference optical signal.

FIG. 17 shows a cross-correlation waveform of the optical beat signal of 160 GHz and the reference optical signal. In the measurement device 200A, the cross-correlation waveform of the optical beat signal of 160 GHz and the reference optical signal is observed by the oscilloscope 50, and for example, the waveform shown in FIG. 16 can be obtained. The abscissa axis denotes a time delay of the optical delay line 40. In FIG. 17, a sine wave with a period of 6.25 ps is observed, and it is verified that the optical beat signal of 160 GHz is synchronized with the reference optical signal. Here, an optical pulse signal of 10 Gbit/s 3 ps is used as the reference optical signal.

Figure 18:
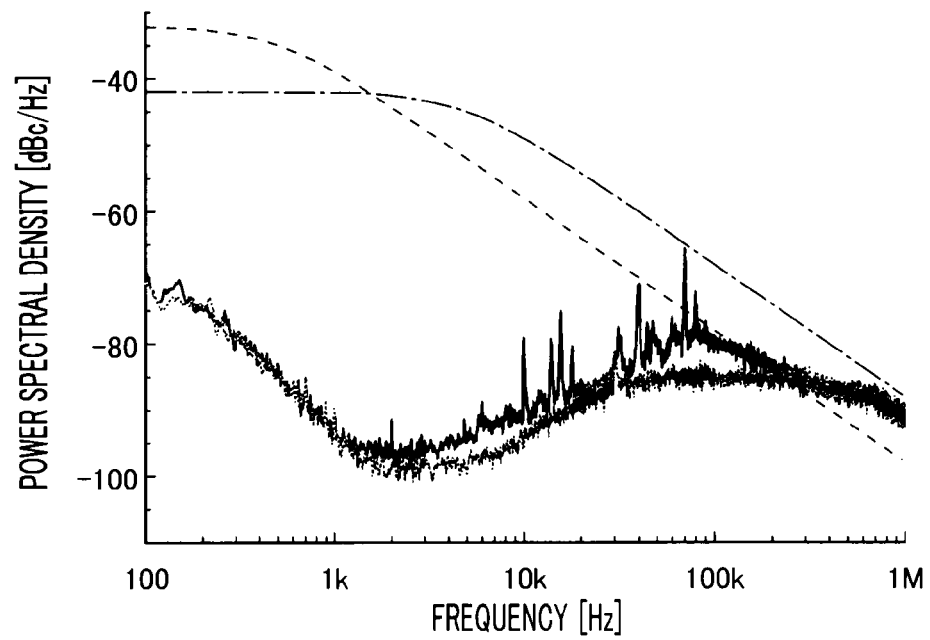
FIG. 18 shows a phase noise spectrum characteristic and background noise spectrum characteristic of an optical beat signal in the synchronous optical signal generating device, and shows theoretical characteristics of phase noise spectrums with line widths of 1 kHz and 10 kHz.

FIG. 18 shows a phase noise spectrum characteristic and background noise spectrum characteristic of the optical beat signal in the synchronous optical signal generating device 200, and shows theoretical characteristics of phase noise spectrums with line widths of 1 kHz and 10 kHz. FIG. 18 is a graph showing power of the signal with respect to a frequency. In FIG. 17, the phase noise spectrum characteristic of the optical beat signal of 160 GHz in the synchronous optical signal generating device 200 is indicated by a black line, the background noise spectrum characteristic is indicated by a dotted line, the theoretical characteristic of the phase noise spectrum with a line width of 1 kHz is indicated by a dotted line, and the theoretical characteristic of the phase noise spectrum with a line width of 10 kHz is indicated by a dashed line. Here, an optical pulse signal of 10 Gbit/s 3 ps is used as the reference optical signal.

FIG. 18 shows that the synchronization is realized from that fact that the phase noise spectrum of the optical beat signal in the synchronous optical signal generating device 200 is reduced as compared with the theoretical characteristics of the phase noise spectrums. The loop band is about 80 kHz. A phase noise amount is obtained by integrating the spectrum, and the phase noise is calculated to be 3.6 degrees.

Figure 19:
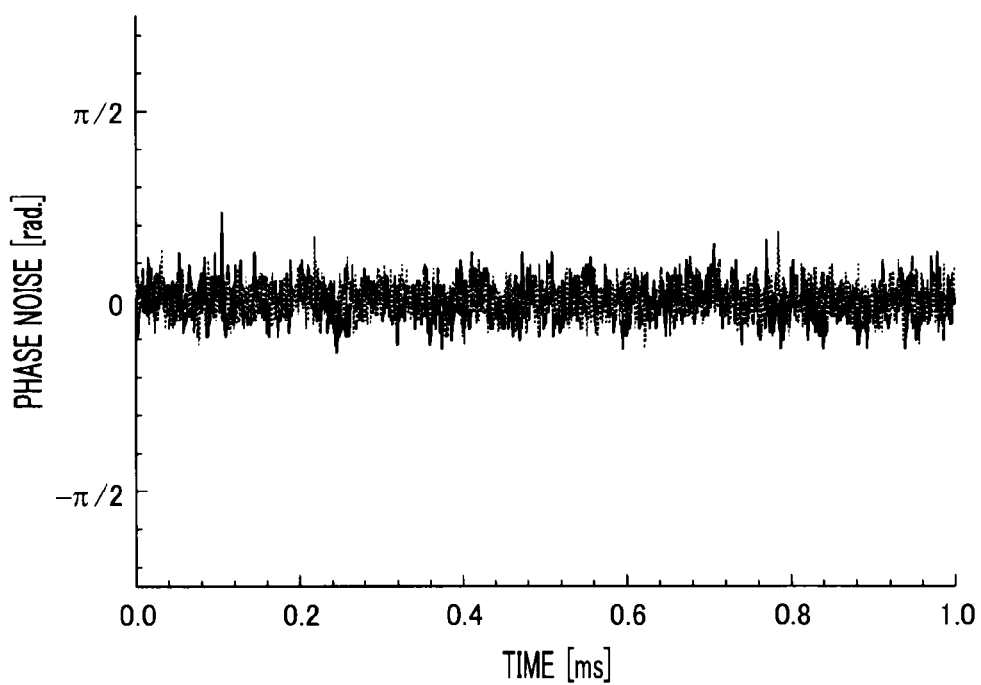
FIG. 19 shows a phase noise waveform characteristic and background noise waveform characteristic of the optical beat signal in the synchronous optical signal generating device.
Figure 20:
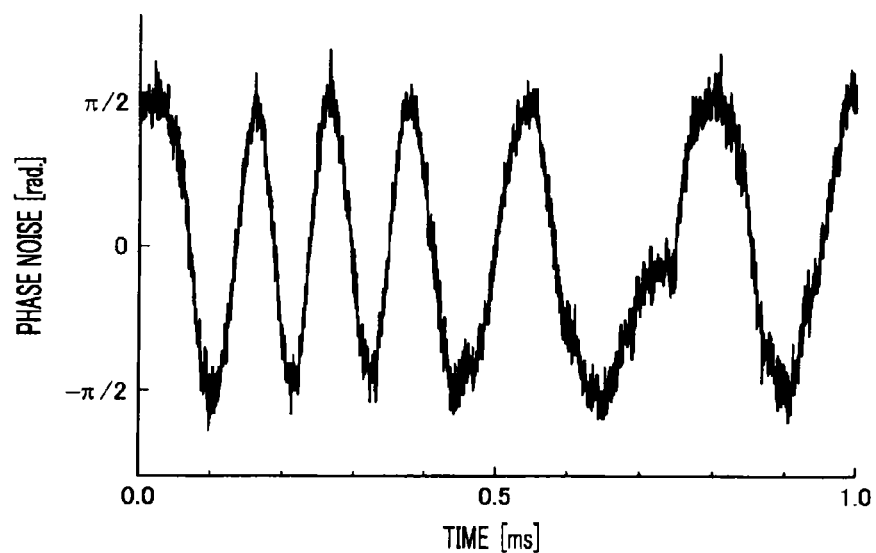
FIG. 20 shows a phase noise waveform characteristic of an output optical signal in the synchronous optical signal generating device in a free running state.
Figure 21:
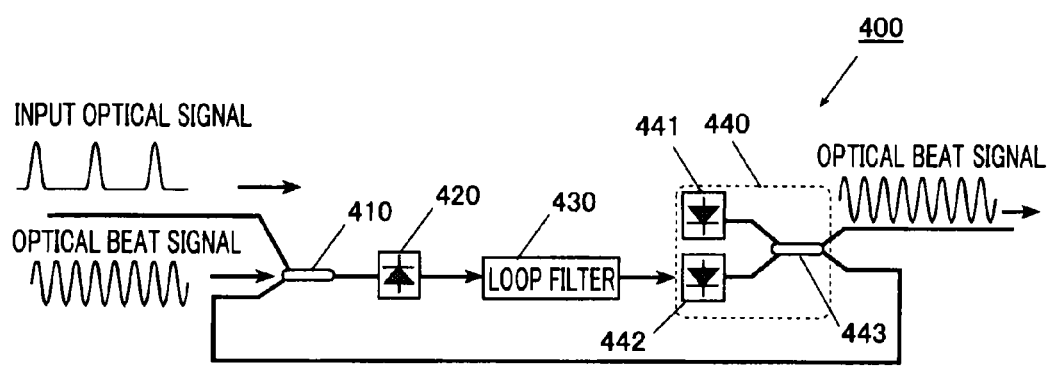
FIG. 21 shows a configuration of an optical phase-locked loop device.

FIG. 19 shows a phase noise waveform characteristic and background noise waveform characteristic of the optical beat signal in the synchronous optical signal generating device 200. FIG. 20 shows a phase noise waveform characteristic of the output optical signal of the synchronous optical signal generating device 200 in a free running state. Here, an optical pulse signal of 10 Gbit/s 3 ps is used as the reference optical signal. FIG. 19 corresponds to FIG. 18, and is a graph showing a phase noise value with respect to time. In FIG. 19, the phase noise waveform of the optical beat signal of 160 GHz in the synchronous optical signal generating device 200 is indicated by a black line, and the background noise waveform of the optical beat signal of 160 GHz in the synchronous optical signal generating device 200 is indicated by a dotted line. In FIG. 20, the phase noise waveform of the output optical signal in the synchronous optical signal generating device 200 in the free running state (in an asynchronous state) is indicated by a black line. As shown in FIG. 20, the phase error signal of the output optical signal in the free running state varies in the range of $-\pi/2$ to $\pi/2$.

According to the phase noise waveform characteristic of the optical beat signal in the synchronous optical signal generating device 200 as shown in FIG. 19, amplitude of the phase error waveform is smaller than in the free running state as shown in FIG. 20, and the synchronous operation can thus be verified. The phase noise amount is obtained by statistically processing a histogram of the phase error amplitude, and the phase noise is calculated to be 2.3 degrees.

In the synchronous beat light source of FIG. 13, the synchronous operation is verified when the loop band is set in the range of 50 to 150 kHz and the total loop length is set to about 110 m. As described above, the synchronous beat light source of the present invention can perform the synchronous operation when the loop length and the loop band are set such that a phase margin shown in FIG. 23 is 60 degrees or more (the phase delay is 30 degrees or less).

Moreover, the loop band is set as wide as possible without the effect of the phase delay of the electrical VCO 31. That is, the loop band in the range of 50 to 300 kHz is preferably used. For example, conditions for the synchronous operation are met when the loop length is set to 500 m or less in the case of the loop band of 50 kHz and when the loop length is set to 80 m or less in the case of the loop band of 300 kHz.

The present example has the same effect as the above embodiments and the modified example (2-mode selection multiplexer 34D). Further, as with Example 1, the load of the VCO 31 due to an increase in frequency of an electrical signal can be reduced by using the double frequency generators 37a and 37b. Also, an optical beat signal can be amplified by the EDFA 38, thereby easily generating a phase error signal by the Si-APD 12.

At least two configurations out of the configurations in the above embodiments, the above modified examples and Examples 1 and 2 may arbitrarily be combined. Further, with respect to a detailed configuration of each component of the synchronous optical signal generating devices described in the above embodiments, the above modified examples and Examples 1 and 2, and a detailed operation thereof, various changes may be made without departing from the scope of the invention.

INDUSTRIAL APPLICABILITY

As described above, a synchronous optical signal generating device and a synchronous optical signal generating method according to the present invention are suitable for an optical communication device which outputs an optical beat signal synchronized with a reference optical signal and for a method of the optical communication.

The invention claimed is:
1. A synchronous optical signal generating device, comprising:
   optical phase detecting means for comparing a phase of a reference optical signal with a phase of an optical beat signal to generate a phase error signal;
   shaping means for shaping the phase error signal; and
   voltage controlled optical signal generating means for generating an optical beat signal based on the shaped phase error signal and outputting the optical beat signal while feeding the optical beat signal back to the phase detecting means, wherein the voltage controlled optical signal generating means includes:
voltage controlled electrical signal generating means for generating an electrical signal corresponding to the shaped phase error signal and outputting the electrical signal;
optical comb generating means for generating an optical comb signal having optical spectrum lines with frequency intervals corresponding to the electrical signal generated by the voltage controlled electrical signal generating means;
2-mode selecting means for selecting optical signals having optical spectrum lines of two different wavelengths from the optical comb signal; and
2-mode multiplexing means for multiplexing the selected optical signals having two different wavelengths and outputting the multiplexed signal as the optical beat signal while feeding the optical beat signal back to the phase detecting means,
wherein a loop band width is not less than 10 kHz and not more than 1 MHz,
a total length of a fiber composing a loop is shorter than a fiber length given by a loop band limited by a voltage controlled oscillator (VCO), and
the reference optical signal and the optical beat signal are controlled so that phases thereof are synchronized,
the optical comb generating means includes
a first laser light source for outputting laser light having a single wavelength, and
light modulating means for modulating the outputted laser light to generate the optical comb signal based on the electrical signal generated by the voltage controlled electrical signal generating means, the light modulating means being light phase modulating means for modulating a phase of the laser light to generate the optical comb signal.

2. The synchronous optical signal generating device according to claim 1, wherein
the optical phase detecting means includes:
first multiplexing means for multiplexing the reference optical signal with the optical beat signal; and
phase comparing means for outputting the phase error signal between the reference optical signal and the optical beat signal based on the multiplexed optical signal.

3. The synchronous optical signal generating device according to claim 1, wherein
the voltage controlled optical signal generating means includes frequency increasing means for increasing a frequency of the electrical signal generated by the voltage controlled electrical signal generating means, and
the optical comb generating means generates the optical comb signal having optical spectrum lines with frequency intervals corresponding to the electrical signal whose frequency is increased by the frequency increasing means.

4. The synchronous optical signal generating device according to claim 1, wherein
the optical comb generating means includes a plurality of light modulating means, and the plurality of light modulating means are connected in multiple stages, and
the optical comb generating means further includes at least one phase shifting means for shifting a phase of the electrical signal and inputting the phase shifted electrical signal into the light modulating means.

5. The synchronous optical signal generating device according to claim 1, wherein
the optical comb generating means includes a nonlinear medium that widens an optical spectrum band of the optical comb signal.

6. The synchronous optical signal generating device according to claim 1, wherein
the 2-mode selecting means includes a passive element.

7. The synchronous optical signal generating device according to claim 1, wherein
the 2-mode selecting means includes:
an arrayed optical waveguide grating for selecting optical signals having optical spectrum lines of two different wavelengths from the optical comb signal, and outputting the selected signals; and
polarization adjusting means for matching a polarization of one of the optical signals outputted from the arrayed optical waveguide grating with a polarization of the other of the optical signals for adjustment, and
the 2-mode multiplexing means multiplexes the one of the optical signals outputted from the polarization adjusting means with the other of the optical signals outputted from the arrayed optical waveguide grating.

8. The synchronous optical signal generating device according to claim 7, wherein
the arrayed optical waveguide grating splits the optical comb signal at frequency intervals corresponding to frequency intervals of the optical comb signal.

9. The synchronous optical signal generating device according to claim 1, wherein
the 2-mode selecting means and the 2-mode multiplexing means include:
a circulator into which the optical comb signal are inputted;
an arrayed optical waveguide grating for selecting optical signals having optical spectrum lines of two different wavelengths from the optical comb signal inputted through the circulator, and outputting the selected signals; and
Faraday rotator mirrors for reflecting the two optical signals outputted from the arrayed optical waveguide grating,
the arrayed optical waveguide grating multiplexes the two optical signals reflected by the Faraday rotator mirrors, and outputs the multiplexed optical signal as the optical beat signal, and
the circulator outputs the optical beat signal inputted from the arrayed optical waveguide grating.

10. The synchronous optical signal generating device according to claim 1, wherein
the 2-mode selecting means and the 2-mode multiplexing means include:
polarization synthesizing means into which the optical comb signal is inputted with a polarization of the optical comb signal maintained;
an arrayed optical waveguide grating for selecting optical signals having optical spectrum lines of two different wavelengths from the optical comb signal inputted through the polarization synthesizing means, and outputting the selected optical signals; and
Faraday rotator mirrors for reflecting the two optical signals outputted from the arrayed optical waveguide grating,
the arrayed optical waveguide grating multiplexes the two optical signals reflected by the Faraday rotator mirrors, and outputs the multiplexed optical signal as the optical beat signal, and the polarization synthesizing means outputs the optical beat signal inputted from the arrayed optical waveguide grating with a polarization of the optical beat signal maintained.

11. The synchronous optical signal generating device according to claim 1, wherein
the 2-mode selecting means includes:
dividing means for dividing the optical comb signal into two signals; and
first and second filtering means for filtering the respective divided optical comb signals to obtain optical signals having optical spectrum lines of different wavelengths from one another, and
the 2-mode multiplexing means multiplexes the optical signals having two different wavelengths from one another outputted from the first and second filtering means.

12. The synchronous optical signal generating device according to claim 1, wherein
the 2-mode selecting means includes:
dividing means for dividing the optical comb signal into two signals; and
second and third laser light sources for generating optical signals having different wavelengths from one another in accordance with the respective divided optical comb signals, and
the 2-mode multiplexing means multiplexes the optical signals having two different wavelengths from one another respectively outputted from the second and third laser light sources.

13. The synchronous optical signal generating device according to claim 1, wherein
the 2-mode selecting means includes:
dividing means for dividing the optical comb signal into two signals;
first phase-locked loop means for receiving one of the divided optical comb signals and a first output optical signal, generating an optical signal having a first wavelength in accordance with a phase difference of the received signals, and outputting the generated signal while feeding back the generated signal as the first output optical signal; and
second phase-locked loop means for receiving the other of the divided optical comb signals and a second output optical signal, generating an optical signal having a second wavelength that is different from the first wavelength in accordance with a phase difference of the received signals, and outputting the generated signal while feeding back the generated signal as the second output optical signal, and
the 2-mode multiplexing means multiplexes the optical signal having the first wavelength outputted from the first phase-locked loop means with the optical signal having the second wavelength outputted from the second phase-locked loop means.

14. The synchronous optical signal generating device of claim 1, wherein the optical comb generating means comprises:
a continuous wave (CW) laser light source; and
an optical phase modulator or an optical intensity modulator to modulate, by the electrical signal, output light from the CW laser light source.

15. The synchronous optical signal generating device of claim 14, wherein the optical phase modulator or the optical intensity modulator outputs the optical comb signal.

16. The synchronous optical signal generating device of claim 15, wherein the optical comb signal is directly input to the 2-mode selecting means.

17. The synchronous optical signal generating device of claim 1, wherein the light phase modulating means is a lithium niobate phase modulator.

18. The synchronous optical signal generating device of claim 17, wherein a spectrum of the outputted laser light is widened according to an RF signal that drives the lithium niobate phase modulator.

19. A generating method of a synchronous optical signal, comprising:
a phase detecting step of comparing a phase of a reference optical signal with a phase of an optical beat signal to generate a phase error signal;
a shaping step of shaping the phase error signal; and
a voltage controlled optical signal generating step of generating an optical beat signal based on the shaped phase error signal and outputting the optical beat signal while feeding the optical beat signal back to the phase detecting step, wherein
the voltage controlled optical signal generating step includes:
a voltage controlled electrical signal generating step of generating an electrical signal corresponding to the shaped phase error signal and outputting the electrical signal;
an optical comb generating step of generating an optical comb signal having optical spectrum lines with frequency intervals corresponding to the electrical signal generated by the voltage controlled electrical signal generating step;
a 2-mode selecting step of selecting optical signals having optical spectrum lines of two different wavelengths from the optical comb signal; and
a 2-mode multiplexing step of multiplexing the selected optical signals having two different wavelengths and outputting the multiplexed signal as the optical beat signal while feeding the optical beat signal back to the phase detecting step,
wherein a loop band width is not less than 10 kHz and not more than 1 MHz,
a total length of a fiber composing a loop is shorter than a fiber length given by a loop band limited by a voltage controlled oscillator (VCO), and
the reference optical signal and the optical beat signal are controlled so that phases thereof are synchronized,
the optical comb generating steps includes
outputting, with a first laser light source, laser light having a single wavelength, and
modulating, with a light modulator, the outputted laser light to generate the optical comb signal based on the electrical signal generated by the voltage controlled electrical signal generating means, the light modulator being a light phase modulator that modulates a phase of the laser light to generate the optical comb signal.

* * * * *